US010382936B2

(12) United States Patent
South

(10) Patent No.: US 10,382,936 B2
(45) Date of Patent: *Aug. 13, 2019

(54) INTERACTIVE EMERGENCY INFORMATION AND IDENTIFICATION SYSTEMS AND AUTHENTICATION METHODS

(71) Applicant: Patrocinium Systems, Inc., Reston, VA (US)

(72) Inventor: John A. South, McLean, VA (US)

(73) Assignee: PATROCINIUM SYSTEMS, INC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,295

(22) Filed: Sep. 14, 2018

(65) Prior Publication Data

US 2019/0182651 A1 Jun. 13, 2019

Related U.S. Application Data

(63) Continuation of application No. 15/388,441, filed on Dec. 22, 2016, now Pat. No. 10,097,980, which is a (Continued)

(51) Int. Cl.
*H04W 4/90* (2018.01)
*G08B 27/00* (2006.01)
(Continued)

(52) U.S. Cl.
CPC ............ *H04W 4/90* (2018.02); *G08B 25/016* (2013.01); *G08B 27/001* (2013.01); (Continued)

(58) Field of Classification Search
CPC ......... H04W 4/22; H04W 4/021; H04W 4/20; H04W 76/007; H04W 4/90; G08B 25/016; G08B 27/001; G08B 27/006
See application file for complete search history.

(56) References Cited

U.S. PATENT DOCUMENTS 5,563,931 A 10/1996 Bishop et al.
5,894,591 A 4/1999 Tamayo
(Continued)

FOREIGN PATENT DOCUMENTS

WO WO 2011/059308 A2 5/2011
WO WO 2013/087719 A1 6/2013
(Continued)

OTHER PUBLICATIONS

Campbell, M., "Apple invention uses iPhone and wearable sensors to monitor activities, automate alarms," http://appleinsider.com/articles/14/06/19/apple-invention-uses-iphone-and-wearable-sensor, Jun. 19, 2014, pp. 1-10.
(Continued)

*Primary Examiner* — Mehmood B. Khan
(74) *Attorney, Agent, or Firm* — Haynes and Boone, LLP

(57) ABSTRACT

A computer-implemented method for interactive emergency information and identification is disclosed. The method includes receiving, by a processor, a notification concerning an emergency situation, wherein the notification includes a location of the emergency situation, and defining, by the processor, a geo-fence representing a first physical area surrounding the location of the emergency situation. The method further includes receiving, by the processor, location information representing locations of a plurality of user devices, each user device being associated with an individual, and determining, by the processor, which of the user devices are located within the geo-fence based on the location information. Additionally, the method includes transmitting, by the processor, information about the emergency situation to the user devices located within the geo-fence.

20 Claims, 18 Drawing Sheets

Related U.S. Application Data continuation of application No. 14/204,084, filed on Mar. 11, 2014, now Pat. No. 9,572,002, which is a continuation-in-part of application No. 14/060,280, filed on Oct. 22, 2013, now Pat. No. 9,247,408.

(51) Int. Cl.
*H04W 4/021* (2018.01)
*G08B 25/01* (2006.01)
*H04W 4/20* (2018.01)

(52) U.S. Cl.
CPC .......... *G08B 27/006* (2013.01); *H04W 4/021* (2013.01); *H04W 4/20* (2013.01)

(56) References Cited

U.S. PATENT DOCUMENTS 6,084,510 A 7/2000 Lemelson et al.
6,509,833 B2 1/2003 Tate
6,745,021 B1 6/2004 Stevens
6,816,878 B1 11/2004 Zimmers et al.
6,882,307 B1 4/2005 Gifford
6,882,837 B2 4/2005 Fernandez et al.
6,885,936 B2 4/2005 Yashio et al.
6,909,903 B2 6/2005 Wang
7,046,140 B2 5/2006 Adamczyk et al.
7,071,821 B2 7/2006 Adamczyk et al.
7,109,859 B2 9/2006 Peeters
7,194,249 B2 3/2007 Phillips et al.
7,233,781 B2 6/2007 Hunter et al.
7,301,450 B2 11/2007 Carrino
7,308,246 B2 12/2007 Yamazaki et al.
7,348,882 B2 3/2008 Adamczyk et al.
7,433,672 B2 10/2008 Wood
7,558,558 B2 7/2009 Langsenkamp et al.
7,593,740 B2 9/2009 Crowley et al.
7,848,765 B2 12/2010 Phillips et al.
7,920,679 B1 4/2011 Naim et al.
7,924,149 B2 4/2011 Mendelson
8,045,954 B2 10/2011 Barbeau et al.
8,073,422 B2 12/2011 Langsenkamp et al.
8,095,610 B2 1/2012 Gould et al.
8,103,239 B2 1/2012 Yamazaki et al.
8,126,479 B2 2/2012 Morrison
8,126,480 B2 2/2012 Morrison
8,145,183 B2 3/2012 Barbeau et al.
8,190,118 B2 5/2012 Sennett et al.
8,204,525 B2 6/2012 Sennett et al.
8,301,112 B2 10/2012 Morrison
8,312,112 B2 11/2012 Stremel et al.
8,320,931 B2 11/2012 Ward et al.
8,351,297 B2 1/2013 Lauder et al.
8,385,956 B2 2/2013 Sennett et al.
8,412,147 B2 4/2013 Hunter et al.
8,442,482 B2 5/2013 Maier et al.
8,442,807 B2 5/2013 Ramachandran
8,458,067 B2 6/2013 Arguelles et al.
8,531,293 B2 9/2013 Putz
8,532,607 B2 9/2013 Sennett et al.
8,542,599 B1 9/2013 Pons et al.
8,548,423 B2 10/2013 Rao
8,552,886 B2 10/2013 Bensoussan
8,594,015 B2 11/2013 Dunn et al.
8,594,707 B2 11/2013 Morrison
8,612,278 B1 12/2013 Ashley, Jr. et al.
8,614,631 B2 12/2013 Pinhanez
8,624,727 B2 1/2014 Saigh et al.
8,660,518 B2 2/2014 Sennett et al.
8,660,520 B2 2/2014 Felt et al.
8,665,089 B2 3/2014 Saigh et al.
8,725,107 B2 5/2014 Brok den et al.
9,247,408 B2 1/2016 South
10,097,980 B2 10/2018 South
2006/0158329 A1 7/2006 Burkley et al.
2006/0223494 A1 10/2006 Chmaytelli et al.
2007/0139182 A1 6/2007 O'Connor et al.
2007/0159322 A1 7/2007 Campbell et al.
2007/0202927 A1 8/2007 Pfleging et al.
2007/0219420 A1 9/2007 Moore
2007/0293240 A1 12/2007 Drennan
2008/0139165 A1 6/2008 Gage et al.
2008/0275308 A1 11/2008 Moore
2009/0005019 A1 1/2009 Patel et al.
2009/0042546 A1 2/2009 McClendon
2009/0172131 A1 7/2009 Sullivan
2009/0258636 A1 10/2009 Helvick
2009/0309742 A1 12/2009 Alexander et al.
2010/0159871 A1 6/2010 Tester
2010/0305806 A1 12/2010 Hawley
2011/0063138 A1 3/2011 Berkobin et al.
2011/0238300 A1 9/2011 Schenken
2011/0319051 A1 12/2011 Reitnour
2012/0002791 A1* 1/2012 Kraus .................. A61B 5/0022 379/37
2012/0071129 A1 3/2012 Haney
2012/0087212 A1* 4/2012 Vartanian ................ G01S 15/08 367/118
2012/0092161 A1 4/2012 West
2012/0130753 A1 5/2012 Lewis
2012/0200411 A1* 8/2012 Best ........................ H04W 4/90 340/539.13
2012/0253551 A1 10/2012 Halimi et al.
2012/0258681 A1 10/2012 Hanover
2012/0282887 A1 11/2012 Khoo et al.
2012/0309409 A1 12/2012 Grosman et al.
2012/0315922 A1 12/2012 Drennan
2012/0329420 A1* 12/2012 Zotti ................. H04M 1/72541 455/404.2
2013/0005363 A1 1/2013 Tester
2013/0012154 A1 1/2013 Ramos
2013/0040600 A1* 2/2013 Reitnour ................. H04W 4/90 455/404.2
2013/0085668 A1 4/2013 Roberts, Sr. et al.
2013/0091452 A1* 4/2013 Sorden .................... G06F 3/048 715/771
2013/0099977 A1 4/2013 Sheshadri et al.
2013/0231137 A1 9/2013 Hugie et al.
2013/0237174 A1 9/2013 Gusikhin et al.
2013/0241726 A1 9/2013 Hunter et al.
2013/0246397 A1 9/2013 Farver et al.
2013/0316751 A1 11/2013 Rao
2013/0324166 A1 12/2013 Mian et al.
2013/0332007 A1 12/2013 Louboutin
2014/0011471 A1 1/2014 Khosla et al.
2014/0031000 A1 1/2014 Hanover
2014/0132393 A1 5/2014 Evans
2014/0143801 A1 5/2014 Russell et al.
2014/0171146 A1 6/2014 Ma et al.
2014/0172873 A1 6/2014 Varoglu et al.
2015/0038109 A1* 2/2015 Salahshour ............. H04W 4/90 455/404.2
2015/0111524 A1 4/2015 South
2015/0163626 A1* 6/2015 Zimmer .................. H04W 4/90 455/404.2

FOREIGN PATENT DOCUMENTS

WO WO 2014/062147 A1 4/2014
WO WO 2014/072910 A1 5/2014
WO WO 2014/075070 A2 5/2014
WO WO 2014/096920 A1 6/2014

OTHER PUBLICATIONS

Roppolo, M., "What to expect at Google I/O 2014 developers conference," http://www.cbsnews.com/news/google-io-2014-rumor-roundup-what-to-expect/, Jun. 21, 2014, 1-4.
"Livesafe/Safety-Related Mobile Technology," http://www.livesafemobile.com, Oct. 31, 2014.
"Business & Corporations—Personal Security App—EmergenSee" http://www.emergensee.com/be-emergensee-safe/business-corporations, Oct. 31, 2014.

(56) References Cited

OTHER PUBLICATIONS

WIPO, International Search Report for International Application No. PCT/US2014/061389, dated Feb. 5, 2015.
WIPO, Written Opinion for International Application No. PCT/US2014/061389, dated Feb. 5, 2015.
Intellectual Property Office of Singapore, Search Report and Written Opinion for Singapore Patent Application No. 11201603128Y, dated Oct. 5, 2016.

* cited by examiner

INTERACTIVE EMERGENCY INFORMATION AND IDENTIFICATION SYSTEMS AND AUTHENTICATION METHODS

CROSS-REFERENCE

This application is a continuation of U.S. patent application Ser. No. 15/388,441, filed Dec. 22, 2016, now issued as U.S. Pat. No. 10,097,980, which is continuation of U.S. patent application Ser. No. 14/204,084, filed Mar. 11, 2014, now issued as U.S. Pat. No. 9,572,002, which is a continuation-in-part of U.S. patent application Ser. No. 14/060,280, filed Oct. 22, 2013, now issued as U.S. Pat. No. 9,247,408, the entire disclosures of each being incorporated herein by express reference thereto.

FIELD

This application relates generally to data processing and, more specifically, to systems and methods for interactive emergency information and identification.

BACKGROUND

During a catastrophic event, people rely on televisions, radios, and other media-consumption devices for up-to-the-minute information about all aspects of the event. Such information may include locations of events, people involved, responding agencies, and victims. Currently, with existing systems, there is no "immediate" flow of information about the event from people in the vicinity of the event to people in a position to provide help (e.g., police, firemen, etc.). Timely response in an emergency situation, however, can depend on accurate and up-to-date information about the emergency situation itself, affected persons, and their state. Prompt acquisition and exchange of such data can be essential in such situations. Current audiovisual surveillance systems in the area of an emergency situation may provide information about the identify of affected persons, but the gathering and analysis of such information may be a time-consuming process. Additionally, the deployment of such surveillance systems may be costly and, generally, is negatively perceived by the public. Historically, during emergencies, state, local, and federal agencies use systems based on radio communications, such as mobile data terminals (MDTs) in emergency response vehicles. They also rely on after-the-fact witness accounts and calls to a 9-1-1 operations center to provide "approximate data" about an event that just occurred.

Moreover, conventional systems cannot provide personalized information and guidelines to individuals affected by an emergency situation, or request and receive information related to the emergency situation from the individuals, particularly on a real-time or near-real-time basis.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for interactive emergency information and identification. For example, the present disclosure encompasses a first embodiment related to a computer-implemented method for interactive emergency information and identification. The method includes receiving, by a processor, a notification concerning an emergency situation, wherein the notification includes a location of the emergency situation, and defining, by the processor, a geo-fence representing a first physical area surrounding the location of the emergency situation. The method also includes receiving, by the processor, location information representing locations of a plurality of user devices, each user device being associated with an individual, and determining, by the processor, which of the user devices are located within the geo-fence based on the location information. Further, the method includes transmitting, by the processor, information about the emergency situation to the user devices located within the geo-fence.

In one embodiment, the method further includes receiving, by the processor, feedback from at least one of the user devices located within the geo-fence, the feedback being generated in a user interface provided on the user devices. Such feedback may include a request for help and/or a statement that no help is required. Further, the feedback may include textual information related to the emergency situation, audio information related to the emergency situation, and/or video information related to the emergency situation. In another embodiment, wherein the geo-fence includes a plurality of proximity zones representing physical areas of different distances from the location of the emergency situation, and the method further includes determining in which proximity zone each user device located within the geo-fence is respectively located. In yet another embodiment, the method includes transmitting emergency instructions associated with the emergency situation to the user devices located within the geo-fence.

As another example, the present disclosure encompasses a second embodiment related to a computer-implemented method for interactive emergency information and identification. The method includes establishing, by a processor, a virtual beacon in association with a landmark, and receiving, by the processor, location information representing locations of a plurality of user devices, each user device being associated with an individual associated with the landmark. The method further includes determining, by the processor, which of the user devices are located within a subscription distance from the virtual beacon based on the location information, subscribing the individuals associated with user devices within the subscription distance to an emergency notification list, and unsubscribing from the emergency notification list the individuals associated with user devices outside of the subscription distance. Further, after establishing the virtual beacon, the method includes receiving, by a processor, a notification concerning an emergency situation, wherein the notification includes a location of the emergency situation, and transmitting, by the processor, information about the emergency situation to the user devices associated with individuals subscribed to the emergency notification list.

In one embodiment, the method further includes defining, by the processor, a geo-fence representing a physical area surrounding the location of the emergency situation, determining, by the processor, which of the user devices are located within the geo-fence based on the location information, and transmitting, by the processor, further information about the emergency situation to the user devices located within the geo-fence. In one embodiment, the number of user devices located within the geo-fence is less than the number of user devices located within the subscription distance from the virtual beacon. In a further embodiment, transmitting information about the emergency situation includes transmitting emergency instructions to the user devices.

As yet another example, the present disclosure encompasses a third embodiment related to a computer-implemented method for interactive emergency information and identification. The method includes displaying, with a user interface executing on a user device associated with an individual, information about an emergency situation received by the user device, and prompting, with the user interface, the individual to provide a current safety status of the individual. The method also includes receiving, via an input to the user interface, the current safety status of the individual, the received safety status being subsequently transmitted to a transmitted to an emergency information and identification system. Further, the method includes prompting, with the user interface, the individual to provide emergency situation data, and receiving, via an input to the user interface, emergency situation data, the received emergency situation data being subsequently transmitted to the emergency information and identification system.

In one embodiment, prompting the individual to provide a current safety status includes displaying a first control element that the individual may activate if help is needed and a second control element that the individual may activate if no help is needed. In another embodiment, prompting the individual to provide emergency situation data includes displaying at least one of a first control element that the individual may activate to provide textual information related to the emergency situation, a second control element that the individual may activate to provide audio information related to the emergency situation, and a third control element that the individual may activate to provide video information related to the emergency situation. In a further embodiment, displaying information about an emergency situation includes displaying a graphical map showing a location of the emergency situation relative to a position of the user device. In yet another embodiment, displaying information about an emergency situation includes altering the appearance of the user interface based on the proximity of the emergency situation to the user device.

BRIEF DESCRIPTION OF DRAWINGS

Embodiments are illustrated by way of example and not limitation in the figures of the accompanying drawings, in which like references indicate similar elements and in which.

DETAILED DESCRIPTION OF PREFERRED EMBODIMENTS

Figure 1:
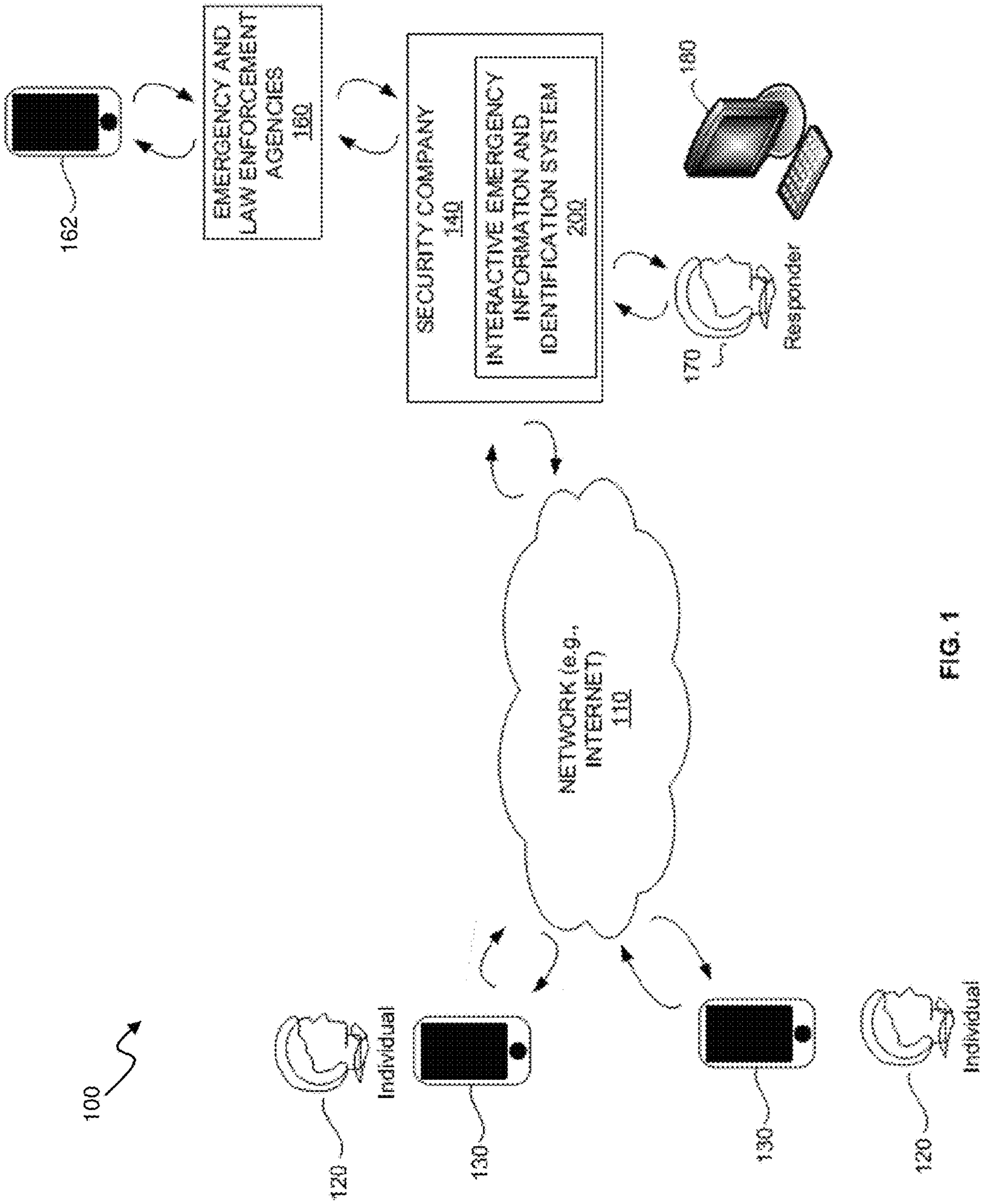
FIG. 1 illustrates an environment within which interactive emergency information and identification systems and methods can be implemented, in accordance to some embodiments.

Interactive emergency information and identification systems and methods are described herein. In case of an emergency situation, such as a shooting, a terrorist attack, and so forth, identities and locations of individuals in proximity to the location of the emergency situation may be determined using the location services of user devices carried by the individuals (e.g., smart phones, tablet computers, etc.). The individuals within a certain distance from the location of the emergency situation may be informed about the emergency situation and requested to provide real-time feedback about the situation, such as their safety status and situational information as they perceive it. The feedback may be provided by civilian level users and/or state or local entities including first-responders such as police or fire officials, or paramedics. Civilian level users or individuals may provide information concerning their condition, safety, and/or whatever information they may have concerning the emergency situation. Audio, video, and/or text data may be received from the individuals via their devices. For example, a photo of an active shooter or a video of a terrorist attack may be received. The received feedback may be forwarded to law enforcement or other appropriate agencies.

Additionally, data from various sources, such as local Emergency Plan Actions or specific plans, e.g., those of the building management where the event occurred, may be retrieved and remotely provided to affected individuals. For example, emergency instructions relative to the emergency situation may be extracted from the data and provided to affected individuals via a user interface of their devices. For example, emergency instructions may be provided in a graphical form as directions on a map displayed on the user device. At the same time, the current position of the individual may be displayed on the map.

In some embodiments, the interactive emergency information and identification system may be used to request assistance in an emergency situation. Thus, a user may send an emergency notification and/or additional data related to the emergency via the user device. The user's geographical position may be determined, and local emergency agencies may be informed about the emergency situation affecting the user. Depending on the nature of the emergency, notification may additionally be provided concurrently to state emergency agencies or authorities, federal emergency agencies or authorities (e.g., FEMA, the FBI, military police, etc.), or both. Additionally, emergency instructions may be retrieved based on the geographical position of the user, typically relative to the emergency, and provided to the user such as via a graphical interface of the user device. The system and methods can use an audio interface, e.g., for users who cannot see well enough to otherwise use the graphical interface, however, caution must be used in such arrangements since sound might attract the cause of an emergency.

Referring now to the drawings, FIG. 1 illustrates an environment 100 within which the interactive emergency information and identification systems and methods can be implemented. The environment 100 may include a network 110, an individual 120 (typically a civilian), a user device 130 associated with the individual 120, a security company 140, an interactive emergency information and identification system 200 operated by the security company, local and federal emergency and law enforcement agencies 160 (e.g., rescue services, police departments, fire emergency services, the FBI, Homeland Security, etc.), a first-responder user device 162, a responder 170, and a work station 180. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 110 may be a network of data processing nodes that are interconnected for the purpose of data communication.

The user device 130 is a network-enabled computing device used by the individual 120 and may be a mobile telephone, a desktop computer, a laptop, netbook, a smart phone, a tablet computer (e.g., an iPad®, Galaxy® or Kindle®), or other computing device that is capable of sending and receiving data over a network. For example the user device 130 may include any number of communication transceivers such as a cellular radio, a WiFi radio, a Bluetooth radio, and any other transceiver capable of communicating with the network 110. The user device 130 further includes a Graphical User Interface (GUI) for displaying a user interface associated with the interactive emergency information and identification system 200. In some embodiments, the user interface is part of an application (or "app") that is provided by the system 200 and downloaded and installed on the user device 130, typically in advance of an emergency event. For example, if the individuals 120 are students associated with a university, the students may download an app to their smart phone and/or tablet as part of enrollment or orientation. Such an app may communicate with the interactive emergency information and identification system 200 using any of the communication transceivers in the user device. For example, the app may receive and transmit emergency information via a cellular data connection and/or a WiFi data connection. In this manner, if cellular towers are overly congested during an emergency situation, the app on the user device can switch to another communication means, such as WiFi, to transmit and receive data. Alternatively, the app can transmit using multiple concurrent communication means, such as cellular and WiFi, although battery life of the device must be considered when doing so.

The user device 130 may also include hardware and/or software configured to determine a geographical location of the user device. For example the user device may determine its present location using a GPS receiver, the WiFi radio, the cellular radio, the Bluetooth radio, and/or any other transceiver configured to determine the current physical location of the user device, or any combination thereof.

The individual 120 may be a bearer or user of the user device 130 who may interact with the interactive emergency information and identification system 200 and/or the responder 170 via a GUI. The responder 170 may communicate with the interactive emergency information and identification system 200 via the work station 180 or otherwise.

The first responder user device 162 is similar to the user device 130, but is used by individuals within emergency and law enforcement agencies. The first responder user device 162 also includes a user interface to facilitate communication with the emergency information and identification system 200, but such user interface may display additional information pertinent to responding to an emergency situation, as will be discussed below. The user interface on the first responder user device 162 may be part of an application (or "app") that is downloaded and installed. Alternatively, the user interface may be web-based and viewable through a standard web browser.

The interactive emergency information and identification system 200 may be operated by a security company 140 that is hired by an entity with a plurality of individuals (such as a university, city, corporation, building management, etc.) to provide information exchange and emergency response services during emergency situations involving the individuals associated with the entity. In general, the interactive emergency information and identification system 200 tracks the locations and safety status of individuals during emergency situations and coordinates the flow of information between individuals and first responders. In that regard, the interactive emergency information and identification system 200 may communicate with one or more local, state, and federal emergency and law enforcement agencies 160 (e.g., rescue or paramedic services, police departments, fire emergency services, the FBI, Homeland Security, etc.) during an emergency situation. The interactive emergency information and identification system 200 may receive one or more notifications associated with emergency situations, emergency action plans, and other data from the emergency and law enforcement agencies 160. Additionally, the interactive emergency information and identification system 200 may transmit information about one or more individuals in proximity to the location of the emergency situation as well as audio, video, and/or text data received from the individual 120 to the emergency and law enforcement agencies 160.

Figure 1A:
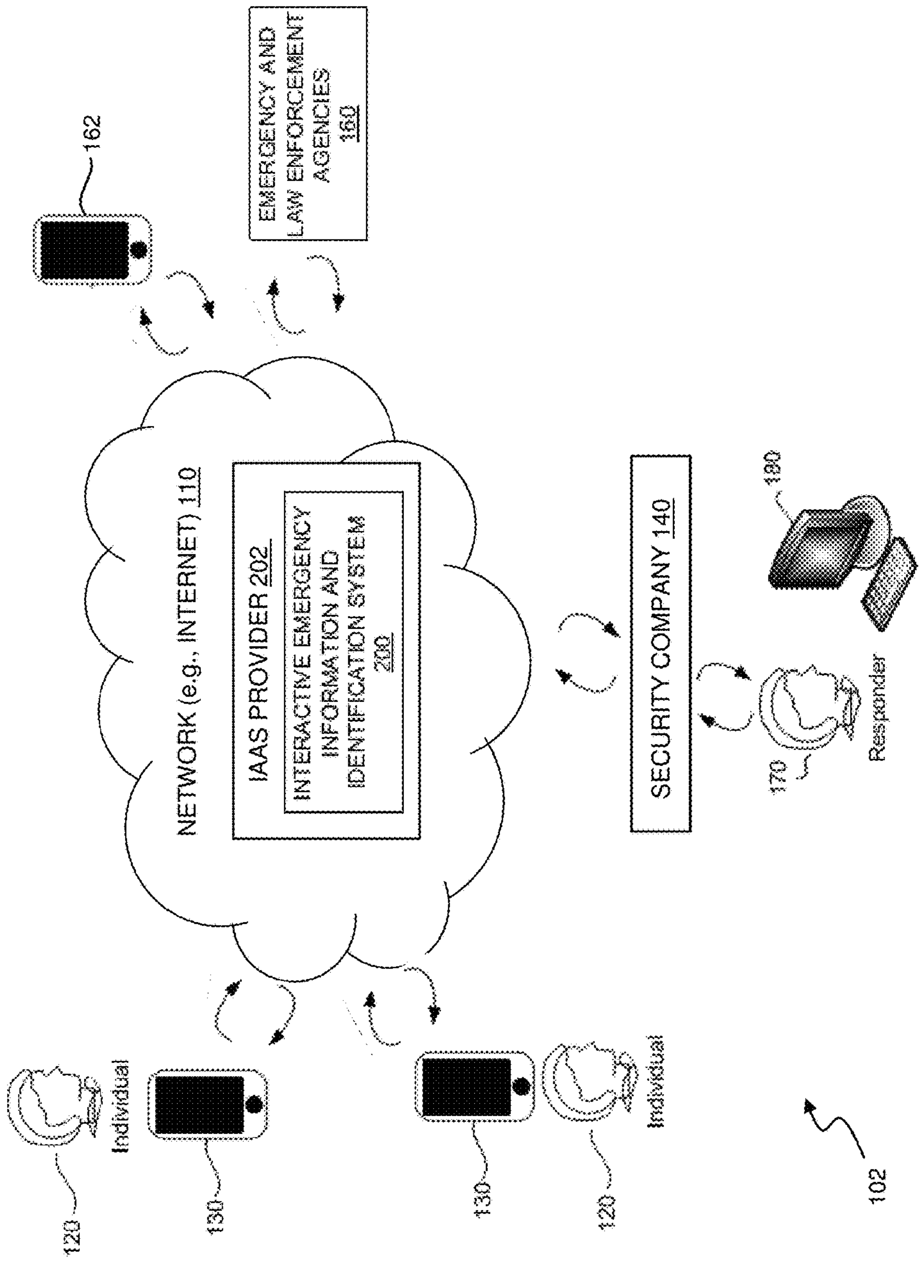
FIG. 1A illustrates another environment within which interactive emergency information and identification systems and methods can be implemented, in accordance with other embodiments of the disclosure.

FIG. 1A illustrates another embodiment of the present disclosure with an environment 102 within which interactive emergency information and identification systems and methods can be implemented. The environment 102 is similar to the environment 100 shown in FIG. 1, but the interactive emergency information and identification system 200 is hosted "in the cloud" on virtual hardware provided by an Infrastructure as a Service (IaaS) provider 202. Specifically, the interactive emergency information and identification system 200 is designed, implemented, and controlled by the security company but executes as a hosted service accessed through the Internet. In one embodiment, the interactive emergency information and identification system 200 may be accessed via a secure web-based application. For example, the responder 170 and operators associated with the law enforcement agencies 160 may connect to the interactive emergency information and identification system 200 via a web browser and log-in to perform administrative tasks. In such an embodiment, any device with a web browser may connect to and interact with the interactive emergency information and identification system 200. Additionally, applications ("apps") installed on user devices 130 and first responder user devices 162 may natively connect to the interactive emergency information and identification system 200 without the use of a browser.

Connections to the interactive emergency information and identification system 200 may be secured with encryption protocols (e.g., Secure Sockets Layer (SSL), HTTPS, etc.) and access may be restricted to authorized users with an authentication and/or authorization layer (e.g., log-in credentials, electronic keys, etc.). Further, all data stored on devices and in databases in the environment 102 may be encrypted to protect sensitive location and profile information associated with individuals. For example, location and profile data stored by the interactive emergency information and identification system 200 may be encrypted by the Advanced Encryption Standard (AES) or other encryption protocol.

Figure 2:
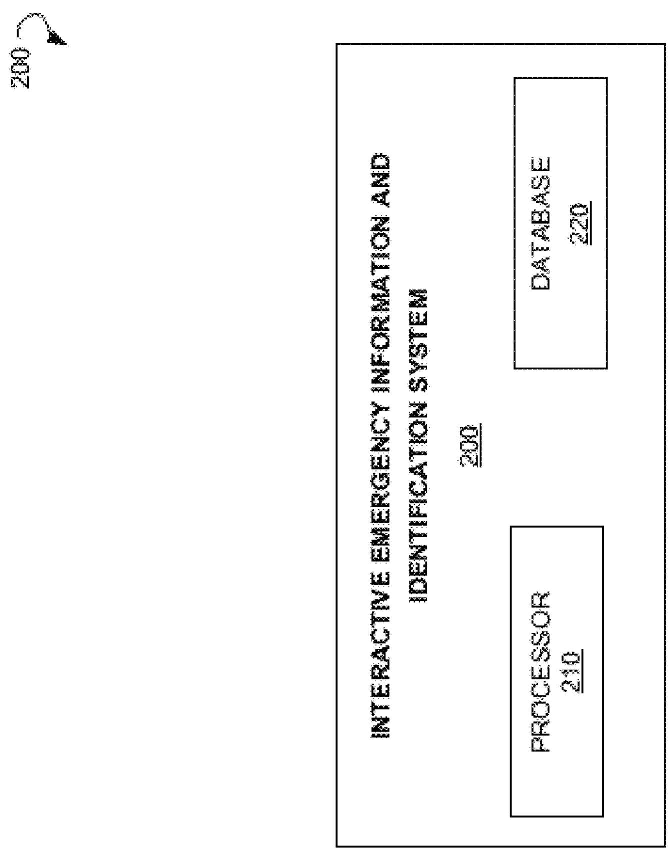
FIG. 2 is a block diagram showing various modules of the interactive emergency information and identification system, in accordance with certain embodiments.

Hosting the interactive emergency information and identification system 200 on virtual hardware provided by the IaaS provider 202 allows the security company 140 to scale up and scale down the capabilities of the system depending on the amount of devices accessing the system. For example, if notification of a major emergency is received, additional virtual instances of the interactive emergency information and identification system 200 may be initiated by the IaaS provider 202 on a temporary basis to handle a larger than normal number of connections to the system and a larger volume of data being transferred between users. FIG. 2 is a block diagram showing various modules of the interactive emergency information and identification system 200, in accordance with certain embodiments. The system 200 may comprise a processor 210 and a database 220. The processor 210 may include a programmable processor, such as a microcontroller, central processing unit (CPU), and so forth. In other embodiments, the processor 210 may include an application-specific integrated circuit (ASIC) or programmable logic array (PLA), such as a field programmable gate array (FPGA), designed to implement the functions performed by the system 200. Thus, the processor 210 may receive a notification concerning an emergency situation. The notification may include a location of the emergency situation and may be received from an emergency or law enforcement agency, one or more users of the system 200, and so forth. In one embodiment, user interfaces on the user device 130 and first responder device 162 may provide a button or other control element through which an individual may submit a report of an emergency situation. Such a report may automatically include the location of user device and any description input by the individual.

Based on the information received about the emergency situation, the processor 210 may define a geo-fence (or geo-net) representing a physical area surrounding the location of the emergency situation. In one embodiment, the geo-fence may be a physical area defined by a circle having a specific radius extending from the location of the emergency situation. The radius may be manually defined by a user, an operator of the system 200, and/or an emergency or law enforcement agency. Additionally, the radius may be automatically determined based on characteristics (e.g., type, severity, etc.) of the emergency situation. In other embodiments, the geo-fence may be defined by other shapes depending on the nature of the emergency situation. For example, the geo-fence may be defined by another geometric shape, or it may be defined by the shape of a physical landmark such as a university campus, a city block, or a specific building. Additionally, the geo-fence may include one or more proximity zones that represent physical areas of different distances from the location of the emergency situation. In the case of a circular geo-fence, the proximity zones may be defined by concentric circles of varying radii extending from the location of the emergency. Further, the system 200 may dynamically alter the size and/or shape of the geo-fence during an emergency situation based on incoming information from first responders, law enforcement agencies, individuals with user devices, news outlets, etc.

The processor 210 may receive location information describing the locations of the user devices 130. The location information may be received based on the defined geo-fence. Since the user devices are associated with individuals, the processor 210 may determine a position of an individual within the geo-fence based on the location information. The position may include a proximity zone associated with the position of the individual.

The processor 210 may inform individuals within and outside of the geo-fence about the emergency situation via a user interface of the user device. Additionally, the user interface may provide individuals with the ability to upload feedback related to the emergency situation to the system 200. The feedback may be received by the processor 210 and may include a request for help, a statement that no help is required, an assessment of the emergency situation, audio information, video information, text information associated with the emergency situation, and so forth. In one embodiment, the system 200 may dynamically alter the size and/or shape of the geo-fence based on the feedback received from the user devices. For instance, an individual may report that a shooter has moved to a second location. The system 200 may then move the center point of the geo-fence to the second location. In some embodiments, two or a larger pre-defined number of reports of such a change might be required to help ensure the geo-fence is not moved prematurely or erroneously. And, such movement of the geo-fence may trigger the transmission of a new round of emergency information messages to individuals now within the newly-located geo-fence. Such movement of the center point of the geo-fence may be performed automatically by the system 200 based on incoming information or it may be performed manually by an administrator with appropriate access to the system (based on login credentials, etc.).

The database 220 stores a list of individuals that may need to be alerted in the case of an emergency. For example, if the environment 100 includes a university campus, such a list may include students, professors, staff, administrators, and anyone else who needs to be alerted if there is an emergency situation on or near the university campus. Each individual in the database 220 is associated with at least one user device 130 that is used to track their location and provide emergency information. Further, identifying information (picture, description, contact information, etc.) and third-party emergency contact information may be associated with each individual in the database. Notifications about the emergency situation, locations of emergency situations, individuals located in proximity to the emergency situation, and feedback received from individuals 120 via user devices 130 may be stored in the database 220. The data in the database 220 may be accessible by an operator of the system 200, one or more first responders, representatives of emergency or law enforcement agencies, and so forth.

Figure 3:
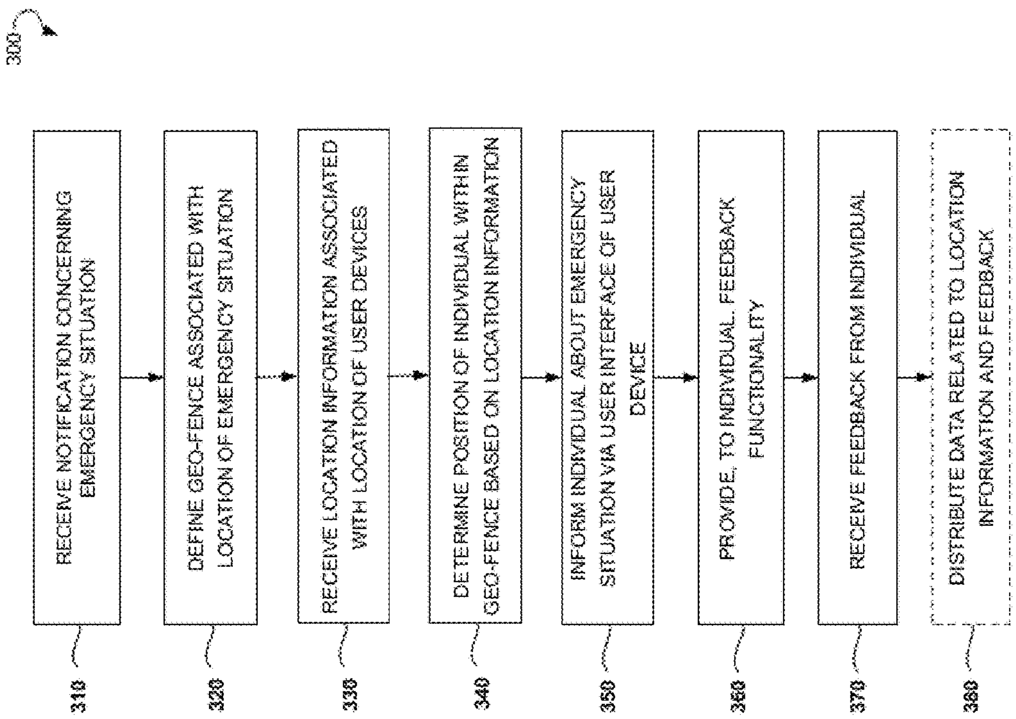
FIG. 3 is a flow chart illustrating an interactive emergency information and identification method, in accordance with some example embodiments.

FIG. 3 is a flow chart illustrating an interactive emergency information and identification method 300, in accordance with some example embodiments. The method 300 may be performed by logic that may comprise hardware (e.g., dedicated logic, programmable logic, and microcode), software (such as software run on a general-purpose computer system or a dedicated machine), or a combination of both. In one example embodiment, the processing logic resides at the interactive emergency information and identification system 200, and the various elements of the system 200 can perform the method 300. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 3, the method 300 may commence at operation 310 with receiving a notification concerning an emergency situation. The emergency situation may include a terrorist attack, a shooting event, a bombing event, an earthquake, a flood, a fire, a hurricane, tornado, an accident, collapsing building, and other natural or man-made disasters. The notification may include a location of the emergency situation and/or its description, classification, type, action plan, and so forth. The location may be described with GPS coordinates, a street address, a street intersection, a landmark, or other information identifying a physical location.

In some embodiments, the emergency notification may originate from one or more sensors positioned in areas of interest. For example, a seismic sensor placed near a fault line may detect seismic activity and transmit a message to the system 200. As another example, a tsunami sensor positioned off shore may detect when water levels are lower or higher than a predetermined threshold for a specific amount of time, or both, and transmit a notification to the system 200. The system 200 would in turn transmit emergency notifications to user devices in coastal areas.

At operation 320, a geo-fence for the emergency situation may be defined, as discussed above. The geo-fence may be defined automatically (at least initially) based on the description, classification, and/or type of the emergency situation. Alternatively, the geo-fence may be manually defined or adjusted by an operator of the interactive emergency information and identification system or by an individual whose user device interacts with the interactive emergency response system. In some embodiments, the geo-fence may include two or more proximity zones. Zones may be differentiated based on proximity to the location of the emergency situation.

At operation 330, location information associated with the locations of user devices may be received. The user devices may include mobile phones, smart phones, tablet computers, laptops, netbooks, and so forth, as described herein. The user devices may be carried by individuals such that the location of user devices may indicate, or at least be used as an indication of, the individuals' locations. In some embodiments, when the system 200 is notified of an emergency situation, the system requests that the user devices report their current location. In other embodiments, the user devices periodically transmit their current location to the system 200 whenever they are powered on, although typically less frequently than during an emergency situation. The location information may be determined via multilateration of radio signals between radio towers, triangulation of GPS signals, WiFi positioning, Bluetooth sensor signals, or any combination thereof.

Additionally, the location information received from the user devices may include information allowing first responders to determine an individual's vertical position in a building or other structure. For instance, received GPS information may include altitude as well as latitude and longitude. Further, a transceiver in the user device, such as a Bluetooth Low Energy transceiver, may detect a user's proximity to various sensors (or beacons) within a building and report such proximity information to the system 200. For instance, a building may include proximity sensor on each floor, enabling a user device to report on which floor it is located. As such, first responders in an emergency situation would not have to spend time searching multiple floors for a victim with a specific longitude and latitude.

Location information received from the user devices is compared with the boundaries of the geo-fence to determine which of the user devices are located within the geo-fence. The user devices may be carried by or be adjacent to individuals and the locations of user devices may indicate the respective individuals' locations. Based on the location information and the geo-fence, positions of individuals (via their user devices) within the geo-fence may be determined at operation 340. In that regard, if it is determined that a user device is located within a geo-fence, in some embodiments, it is further determined in which proximity zone within the geo-fence the user device is located. The specific proximity zone associated with a user device may indicate the threat level to the individual carrying the device.

At operation 350, the individuals within the geo-fence may be informed about the emergency situation via a user interface of the user device associated with the individual. Specifically, the system 200 transmits the emergency information to the user devices within the geo-fence, for example, as a push message. In this context, a push message is a message that is received by a user device without the user device requesting it. Such push notifications may be transmitted to user devices automatically or manually in different embodiments. For instance, in one embodiment, when the system 200 receives information about an emergency, the system may process the information and automatically send a push message to affected users. In other embodiments, an administrator of the system 200 may be alerted to the incoming emergency information at an administrator user interface and manually cause the system to transmit push messages to selected or pre-selected user devices. The user interface from which the administrator sends the messages may be a web interface on a computer console located at an emergency response center or the user interface may be executing on a first responder device 162 in the field. In that regard, user of the system with administrator rights (for example, as determined by login credentials) may send out emergency notifications directly from an app running on a smart phone, tablet computer, laptop, or other mobile device.

Once the push messages have been transmitted, tan affected individual may be informed of the emergency by a message displayed on a screen of the user device. In some embodiments, individuals outside of the geo-fence will also be warned of the emergency situation, but the message received and displayed on their user devices may be different—for example, it may be less specific or lack any emergency instructions. Those individuals proximate to but outside may get more information than those not proximate to the geo-fence, such as information to help avoid re-entering the geo-fence during the remainder of the emergency situation. This is discussed in more detail in association with FIGS. 14-15. As mentioned above, in some embodiments, the user device includes an application (or "app") associated with the interactive emergency information and identification system 200 that receives, transmits, displays emergency information and collects location information on the user device. In some embodiments, such an app may automatically start when the user device is turned on and perpetually run in the background. As such, when an emergency message is received from the system 200, the app is available to display the message regardless of the user's current device activity.

In some embodiments, the content of the emergency message and display format of the message on the device screen may depend on the proximity zone associated with the individual (i.e., the threat level to the individual). For example, a user in a proximity zone immediately adjacent the location of the emergency may receive a detailed message describing the situation and also instructions to immediately take cover. A user in a proximity zone further away from the location of the emergency may receive a more general message without instructions, or with instructions only on which direction to move to avoid the emergency. Such customization of messages based on proximity may decrease panic among individuals outside of harm's way.

Additionally, the user interface color and font scheme may change based on the proximity zone associated with the individual. In one embodiment, if an individual is located in a proximity zone immediately adjacent the location of the emergency situation, the user interface may display bold font over a red background to indicate a high threat level. A yellow background may be presented to a user in a more distant proximity zone. As an individual moves between proximity zones, the user interface color scheme may change to indicate a change in threat level. Further, the app may cause the user device to emit a warning sound corresponding with the display of the message (even if the device is set to a "silent" mode).

Additionally, the content of the push message displayed on a user device may depend on the type of individual associated with the user device. For instance, a policeman with a first responder user device 162 may receive additional detail about a shooter that would not be transmitted to a civilian. An authorization step requiring login credentials may be used to differentiate between individuals (e.g., individual civilians, civilian building management, police, fire, etc.) accessing the app on a user device.

In operation 360, a functionality to give feedback may be provided to the individual via the user interface, and the feedback may be received at the system 200 at operation 370. Thus, information on the state of the individual may be requested. In such a way, the interactive emergency information and identification system may receive information on a number and state of individuals who are affected by the emergency situation. Moreover, audio, video, text, and other data related to the emergency situation may be received from the individual. For example, the data may include a photo of a shooter in a shooting event, information on suspicious activity noticed by the individual, and so forth.

At optional operation 380, the data related to the feedback of the individual and location information may be distributed to corresponding agencies, and/or individual users. The volume and details of the data provided to different parties may depend on agreements and settings with the parties. Additionally, the distribution of individuals' feedback to first responders may be prioritized based on the proximity zone of the individual providing the feedback. For instance, feedback from an individual close to an emergency event may be transmitted to law enforcement agencies first, followed by feedback from individuals in more distance proximity zones. In this manner, first responders can receive and give priority to the most pertinent information.

The data, also transmitted to corresponding agencies, may be used by them to facilitate emergency situation management and relief.

In some embodiments, emergency instructions associated with the emergency situation may be provided to the individual via the user interface (for example, as a text or as graphical instructions). The emergency instructions may be based on an emergency action plan associated with the emergency situation, instructions provided by corresponding agencies, and so forth. Additionally, the instructions may vary depending on the proximity zone associated with the position of the individual. For example, an individual within 10 meters of a shooter may receive instructions to take cover, while an individual within 50-100 meters of the shooter may receive instructions to move away from the shooter.

The current position of the individual may be continuously monitored and actions of the individual may be coordinated, such as by the system itself, or by an authorized administrator. For example, the individual may be informed that he is approaching a fire or moving away from a rescue team or informed about recommended moving directions, or that it is safe to use a particular exit route because the emergency is over or has shifted location. In some embodiments, if a large number of individuals are within a geo-fence surrounding an emergency situation, the system 200 may automatically transmit warning messages to the individuals' user devices based on their positions relative to the location of the emergency situation.

In some embodiments, a user of the interactive emergency information and identification system may send an assistance request. The system may receive the request and provide assistance to the user. The assistance may include informational assistance, transmitting the assistance request to an emergency agency, first aid service, and so forth.

Figure 4:
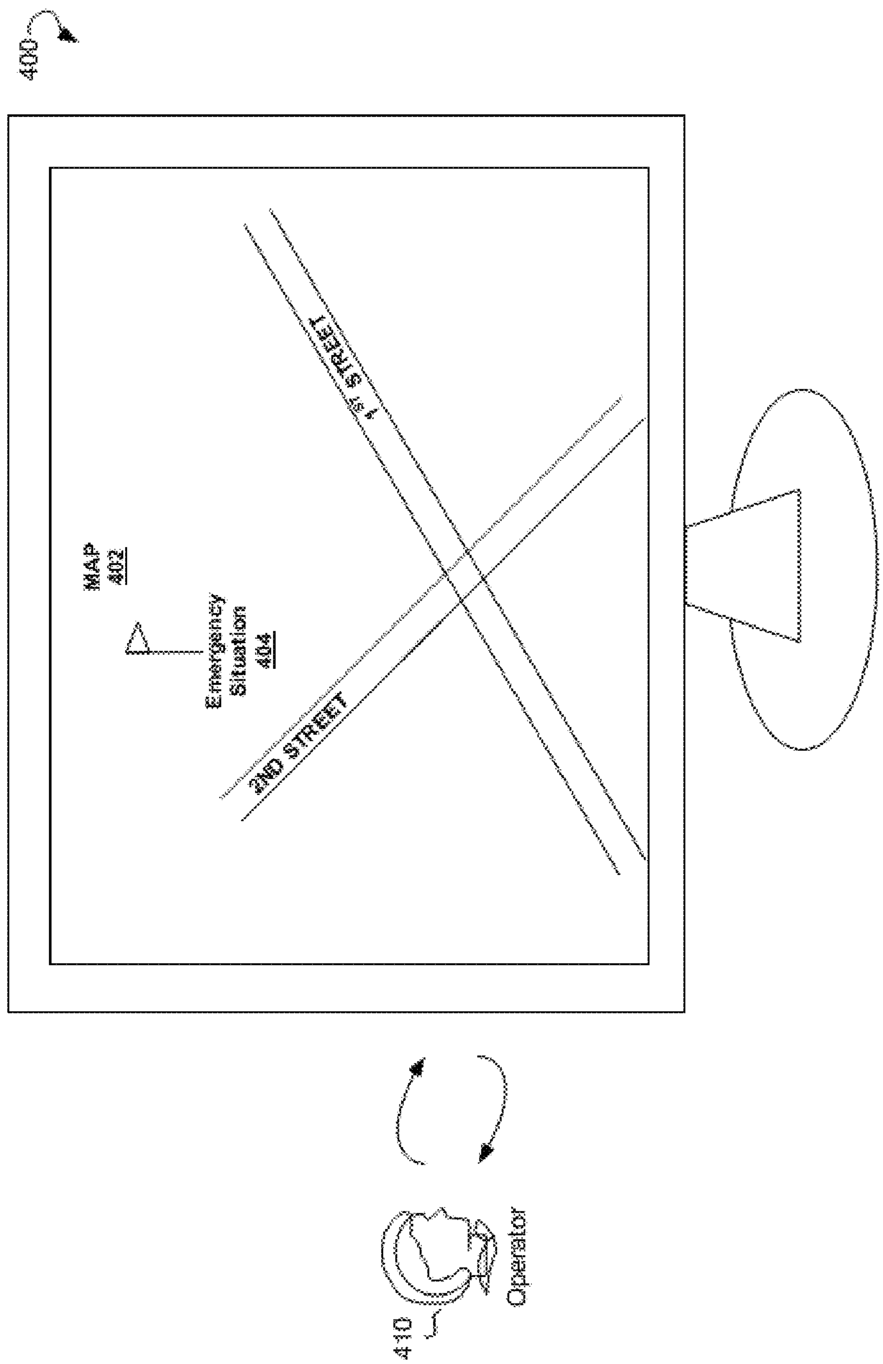
FIG. 4 illustrates a screenshot of an emergency situation, in accordance to some embodiments.

FIGS. 4-10 show example user interface screens illustrating aspects of the emergency situation information and identification system 200. FIG. 4 illustrates an example screen 400 of an emergency situation from an administrator's point of view, in some embodiments. The administrator may be an operator 410 associated with the security company 140 or the administrator may be associated with the emergency and law enforcement agencies 160. The example screen 400 is one aspect of an administrative user interface that gives administrators information and control of the interactive emergency information and identification system 200. The administrative user interface may be accessed via a web-browser or dedicated application on any computing device with a network connection to the system 200.

The example screen 400 contains a map 402 displaying the geographical location of an emergency situation 404. As described in association with operation 310 in FIG. 3, a notification about the emergency situation may be received by the interactive emergency information and identification system 200 from a corresponding emergency, government, or law enforcement agency, a user of the system 200, or another source. The notification may include data on a location 404 of the emergency situation. The location 404 of an emergency situation is extracted by the system 200 and defined on the map 402 which may be displayed to an operator 410 via the administrative user interface.

Figure 5:
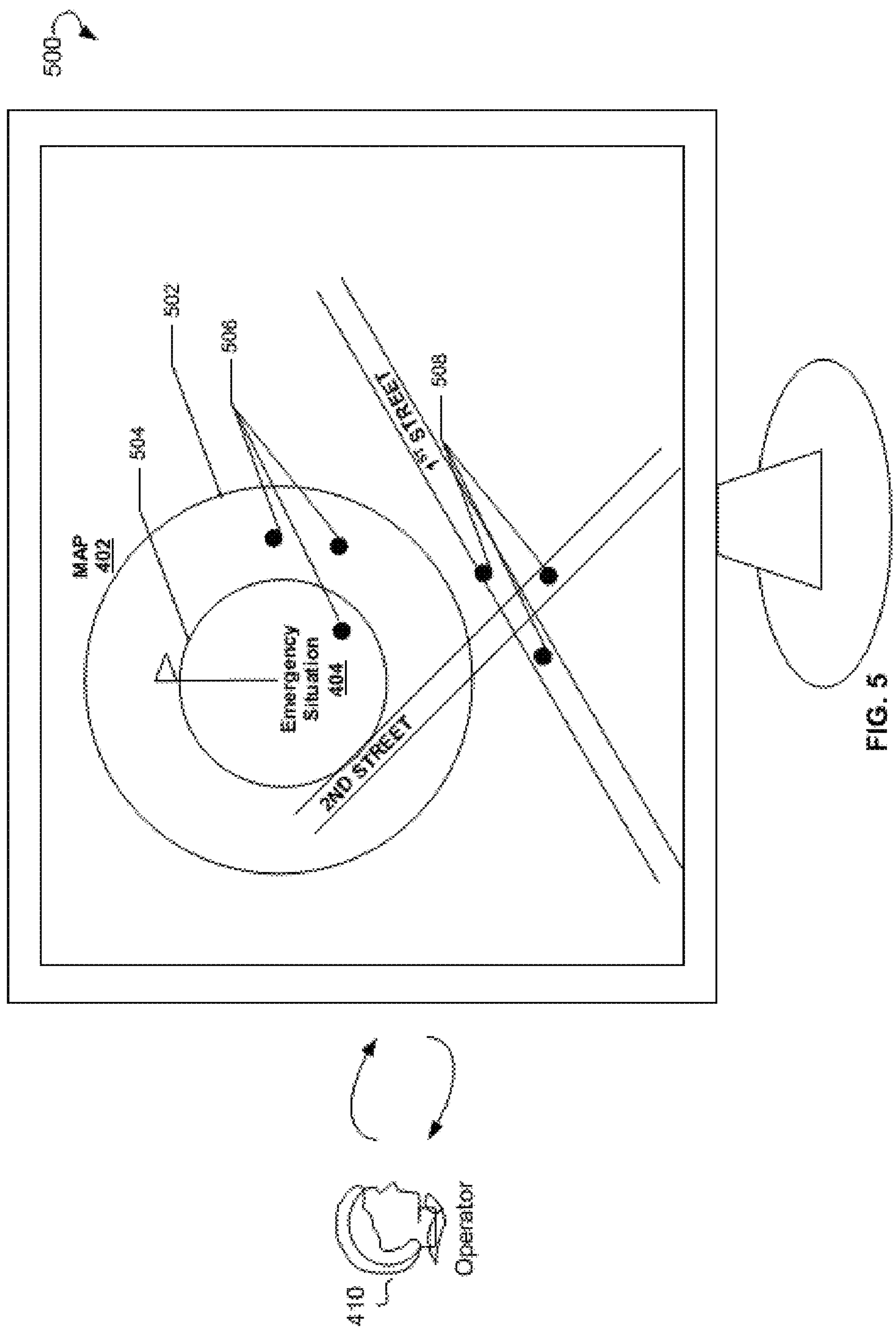
FIG. 5 illustrates a screenshot of defining a geo-fence of an emergency situation, in accordance to some embodiments.

FIG. 5 illustrates one embodiment of an example screen 500 of the administrative user interface, as viewed by an operator 410. In the illustrated embodiment, the screen 500 contains a graphical map 402 showing a geo-fence 502 that is defined by a circle with a specific radius extending from the location of the emergency situation 404. That is, the center of the geo-fence 502 is typically the location 404 of the emergency situation. The center can also be set based on predicted movement of the location 404 of the emergency situation, for example, if a shooter or terrorist is in a vehicle moving down a road. In some embodiments, several proximity zones may be defined within the geo-fence 502. For example, a proximity zone A (enclosed by a circle 504) may be a physical area with a radius of 50 meters. A proximity zone B may be, for example, a physical area between 50 and 100 meters from the location 404 (between the circles 504 and 502).

Location information received from user devices associated with individuals known to the system 200 may be processed to determine which of the user devices are within the geo-fence 502. In the example of FIG. 5, the user devices with positions 506 are inside the geo-fence 502. Additionally, the user devices with positions 508 are outside, but in proximity to the geo-fence 502. In one embodiment, a filter can be applied to screen out devices that are no longer active, such as devices that have not moved or been activated by a user during the emergency. Screen 500 illustrates the positions 506 and 508 defined on the map 402 in relation to the location 404 of the emergency situation. Each of the positions 506 may be associated with a proximity zone within the geo-fence 502.

The screen 500 may be displayed to the operator 410 to visualize positions and movements of the individuals in relation to the location of emergency situation 404 in real time. Each of the positions 506, 508 may be accompanied by brief information associated with the individual. The information may be updated in real time and may include name, age, state, phone number, a photograph of the individual, and other data related to the individual that may have been provided before, or during, the emergency.

In some embodiments, the operator 410 may connect and communicate with one or more specific individuals or small groups believed to be proximate to or distant from the emergency to obtain more information via the administrator's user interface. Such communication may occur via phone, voice-over-IP (VoIP), SMS/MMS text messages, Internet-based text messages, and so forth. The connection may be automated using the administrative user interface. Typically, a silent method is preferred so that no sound need be made on or near an individual's device that is near the emergency location 404. Thus, the operator 410 may call or otherwise contact one of the individuals without having to dial phone numbers, the operator 410 may simply activate an interface control element, and the system 200 will perform the connection automatically.

Figure 5A:
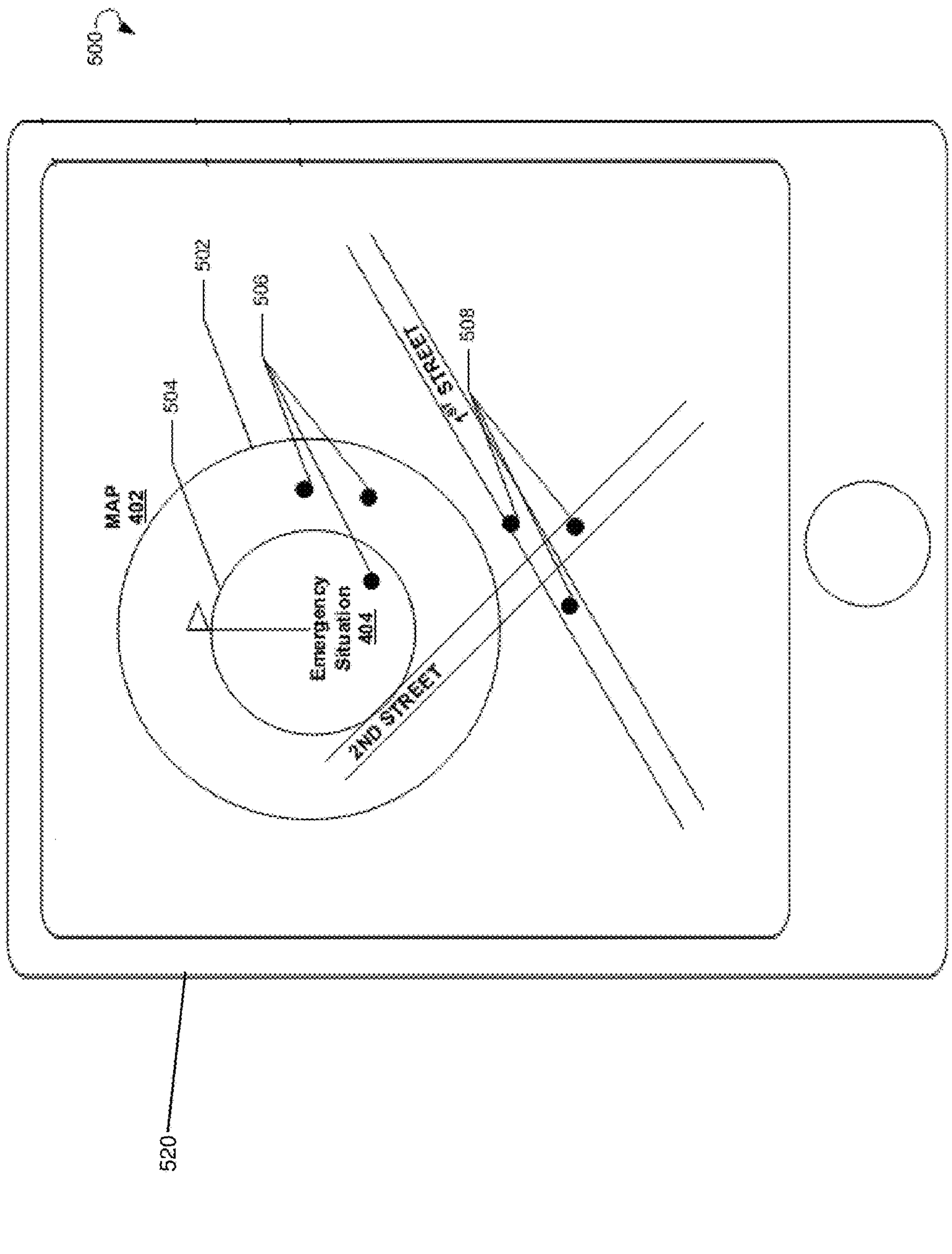
FIG. 5A illustrates the screenshot of FIG. 5 but as displayed on a mobile device of a first responder.

FIG. 5A illustrates the same example screen 500 of the administrative user interface, however, in the embodiment of FIG. 5A, the screen 500 is displayed on a tablet computer 520 or other mobile device belonging to a first responder or other law enforcement official. As described above, the administrative user interface, including map 402, may be accessed on a tablet computer or other mobile device via a web browser or a dedicated application (or app). As such, a first responder may have real-time access to emergency situational information in the field.

Figure 6:
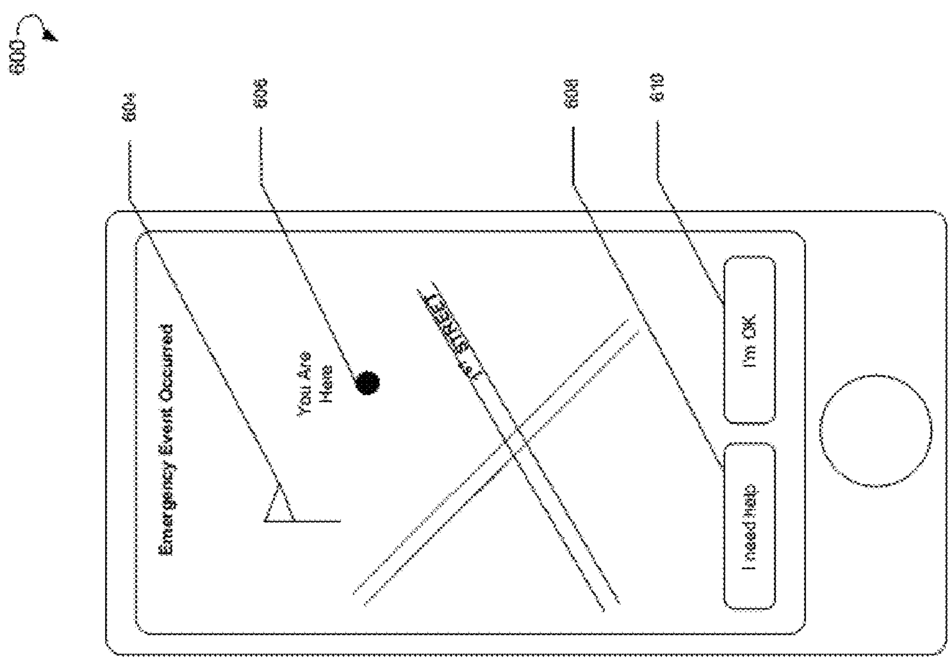
FIG. 6 illustrates a screenshot of an emergency situation notification, in accordance to some embodiments.

FIG. 6 illustrates an example screen 600 of an emergency situation notification shown on the display screen of an individual's user device 130. In one embodiment, the example screen 600 may be part of a user interface rendered by an application (or "app") associated with the interactive emergency information and identification system 200. The notification may be shown on the display of the user device 130 after being received as a as a push message from the system 200. In some embodiments, the screen 600 will interrupt any other activity being performed on the user device so as to immediately notify the individual of the emergency situation. The notification includes a location 604 of an emergency situation relative to a position of the individual 606. The location 604 and the position 606 may be shown on a map. As described above, in some embodiments, the display format of the message may depend on the proximity zone associated with the individual (e.g., red theme for high threat level, yellow theme for medium threat level, green theme for low threat level).

Additionally, a functionally to give feedback may be provided to the individual. Thus, the individual may send a request for help by activating an "I need help" button 608, or may define his state as satisfactory by activating an "I'm OK" button 610. The activation button 608 may involve certain swiping or other gestures to help minimize accidental input under emergency conditions, or may be set as simply as possible and erroneous input screened out. In one embodiment, when an individual activates the "I'm OK" button 610 the system 200 automatically sends a message (via SMS, email, etc.) to the emergency contacts associated with the individual in the database 220. As such, family and friends of individuals affected by an emergency will quickly know whether their loved ones are safe, thus reducing the amount of telecommunication congestion during an emergency. If an individual instead activates the “I need help” button 608, first responders or other law enforcement are alerted to the individual’s location and safety status. In some embodiments, the user device 130 may capture user feedback in additional manners, such as in respond to voice commands. For example, an individual may be able to simply speak the phrase “I need help” without having to select a button in the user interface. In some embodiments, when an individual activates the “I need help” button 608 the system 200 automatically sends a message (via SMS, email, etc.) to the emergency contacts associated with the individual in the database 220.

Figure 7:
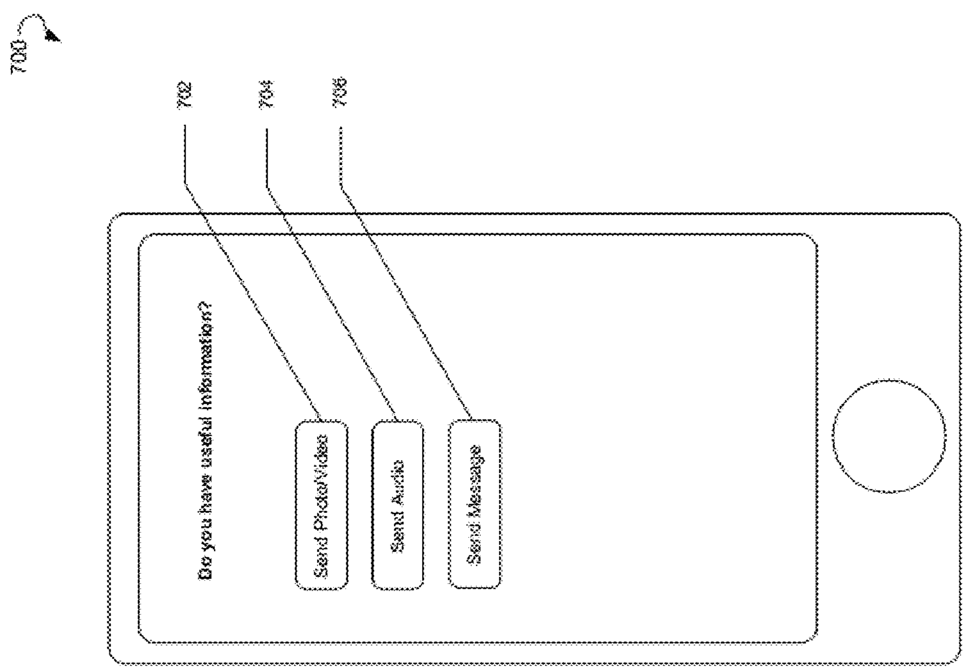
FIG. 7 illustrates a screenshot of providing emergency situation data, in accordance to some embodiments.

Furthermore, the interactive emergency information and identification system 200 may provide a functionality allowing the individual to send data associated with the emergency situation to the system. In that regard, FIG. 7 illustrates an example screen 700 for providing emergency situation feedback, in accordance to some embodiments. The screen 700 may include at least “Send Photo/Video” 702, “Send Audio” 704, and “Send Message” 706 control elements. The data sent using the control elements 702-706 may be transmitted to the interactive emergency information and identification system 200 and then forwarded to appropriate agencies.

Figure 8:
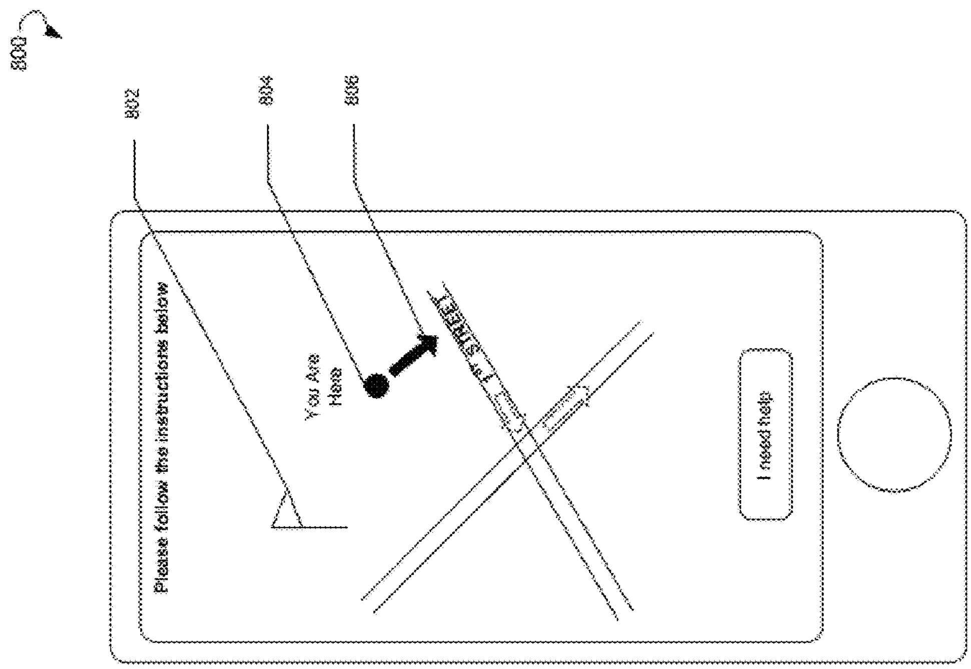
FIG. 8 illustrates a screenshot of providing emergency action instructions to the individual affected by the emergency situation, in accordance to some embodiments.

FIG. 8 illustrates an example screen 800 for providing emergency action instructions to an individual affected by the emergency situation, in accordance with some embodiments. The instructions may be provided via a user interface of user device 130 associated with the individual. In that regard, the example screen 800 may be rendered by an application (or “app”) that receives emergency instruction data from the interactive emergency information and identification system 200. In some embodiments, the instructions may be graphical directions 806 shown in relation to a location 802 of the emergency situation and a position 804 of the individual. As discussed above, the instructions transmitted to an individual may vary based on the individual’s distance from the location of the emergency situation. The emergency instructions may also include text, audio, or video messages, or any other form of communication.

Received feedback related to the safety status of individuals (e.g. “I’m ok,” “I need help,” etc.) may be collected and analyzed by the system 200. Based on the analysis, consolidated data representing the real-time safety status of each individual may be generated. The consolidated data may be provided to an operator via the administrative user interface.

Figure 9:
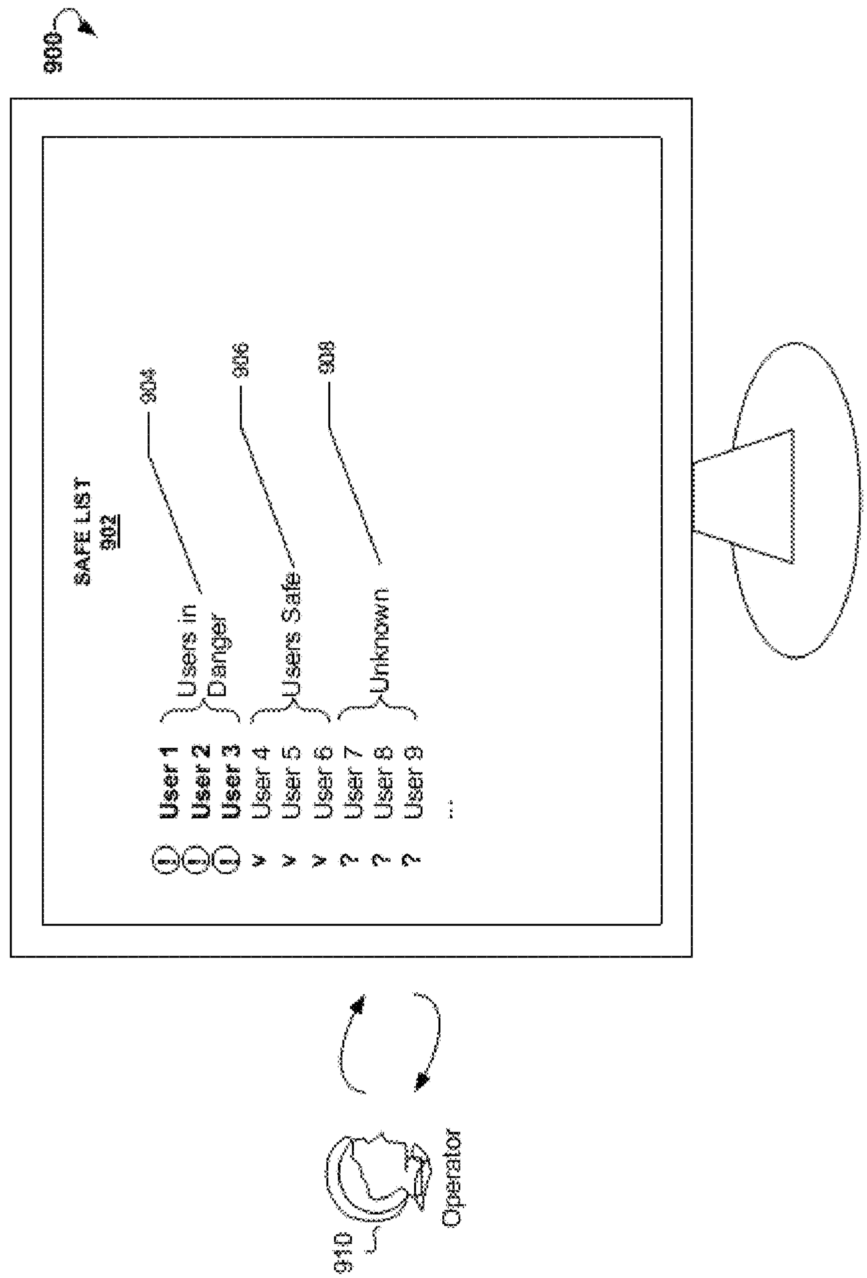
FIG. 9 illustrates a screenshot of providing individual safety information, in accordance to some embodiments.

In that regard, an example screen 900 displaying reported safety statuses of the individuals in real time is illustrated by FIG. 9. The example screen may be one aspect of the administrative user interface provided by the system 200. A safe list 902 may be shown to an operator 902. The safe list 902 may graphically differentiate users of the system 200 (or individuals) with different safety statuses. For example, users in danger 904 may be highlighted by color, font size, special symbols, and so forth. Users safe 906 and users whose status is Unknown 908 may be indicated by other symbols, colors, and so forth. In this manner, operators of the system 200 can quickly determine who is in danger and alert law enforcement agencies. In some embodiments, first responders and law enforcement may have direct access to the safe list 902 on their mobile devices.

Figure 9A:
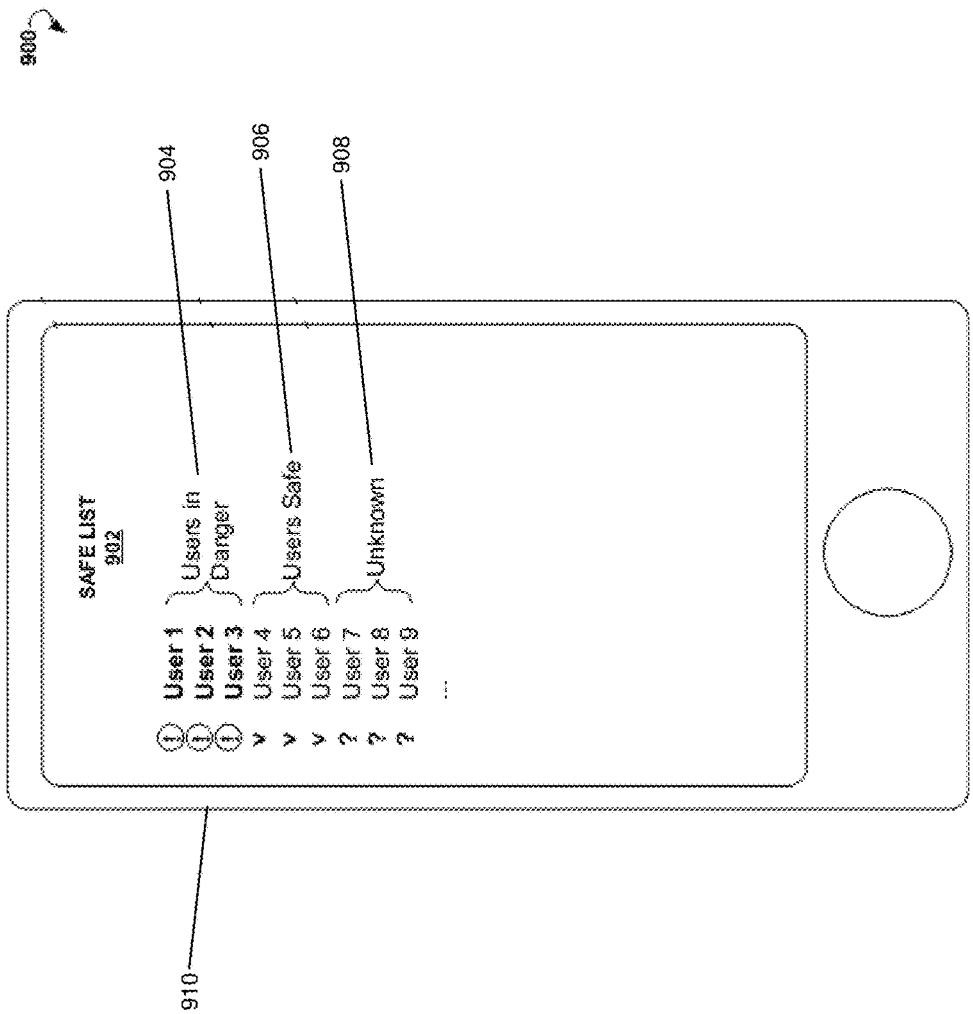
FIG. 9A illustrates the screenshot of FIG. 9 but as displayed on a mobile device of a first responder.

In that regard, FIG. 9A illustrates the same example screen 900 of the administrative user interface, however, in the embodiment of FIG. 9A, the screen 900 is displayed on a mobile device 910 belonging to a first responder or other law enforcement official. As described above, the administrative user interface, including screen 900, may be accessed on a smart phone, tablet computer, or other mobile device via a web browser or a dedicated application. As such, a first responder may have real-time access to emergency situational information in the field. Civilian users of the system 200 would not have access to the same level of information as administrators. For instance, a policeman with a first responder user device 162 may receive additional detail about a shooter that would not be transmitted to a civilian. An authorization step requiring login credentials may be used to differentiate between individuals accessing the app on a user device.

Figure 10:
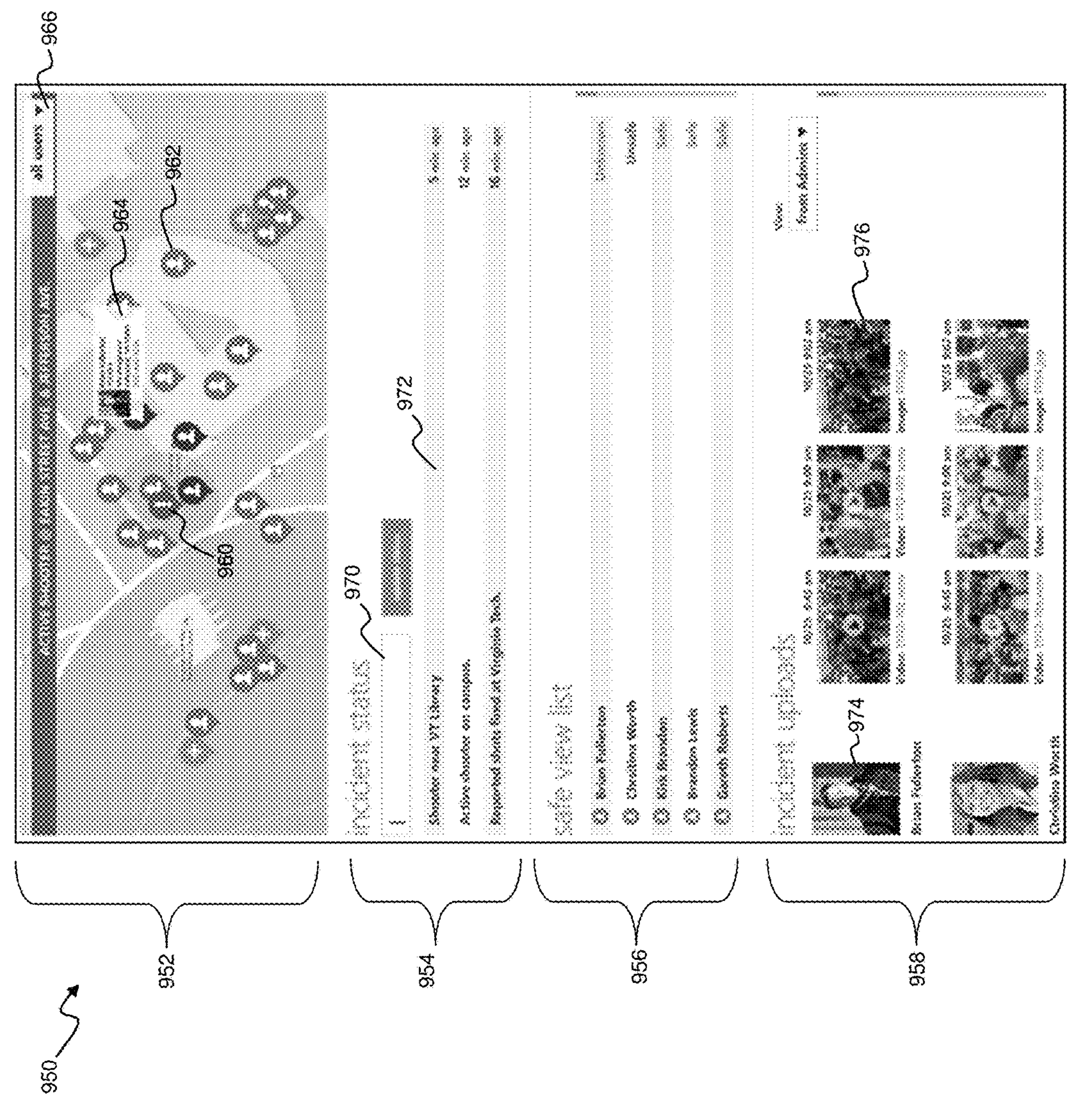
FIG. 10 illustrates an example screen of an administrative user interface provided by the interactive emergency information and identification system.

FIG. 10 illustrates another example screen 950 of the administrative user interface provided by the interactive emergency information and identification system 200, according to one embodiment of the present disclosure. The example screen 950 combines elements of the screens discussed in FIGS. 4, 5, and 9 into a single administrative dashboard that provides efficient information dissemination. In that regard, the administrative dashboard includes a map element 952, an incident status element 954, a safe list element 956, and an incident upload element 958. The administrative dashboard may be directly accessed by an authorized administrative user on a desktop computer, smart phone, tablet computer, or other mobile device via a web browser or a dedicated application.

The map element 952 is similar to the map 402 shown in FIGS. 4 and 5 in that it graphically displays the geographical location 960 of an emergency situation and the locations 962 of one or more individuals in the database 220 of the system 200. The icons representing individuals on the map element 952 may be color-coded to depict the safety status of the respective individuals. In one embodiment, an operator of the administrative dashboard may select (with a mouse, finger, etc.) one of the individuals displayed on the map to bring up an information window 964 that includes details about the selected individual. For instance, the information window 964 may include name, picture, ID number, address, telephone number, email address, safety status, and other pertinent information. Additionally, the information window 964 may provide the operator with a way of directly contacting the individual, for instance, by selecting the telephone number or email address. Further, the map element 952 includes a group selector 966 that allows an operator to change the types of individuals displayed on the map. In the illustrated embodiment, “all users” is selected so that the locations of every user in the database 220 are displayed on the map. However, selecting a different group using the group selector 966 may allow the operator to view the locations of fewer than all users. For instance, the operator may choose to only view the locations of individuals based on their proximity to the emergency situation (e.g., 50 meters, 200 meters, 500 meters, 1 kilometer, etc.), their reported safety status (e.g., “I’m OK”, “I need help,” unknown, etc.), their title (e.g., student, professor, staff, etc.), their last known location (e.g., in case their mobile device was turned off or is inoperable), and other characteristics that may differentiate between individuals and otherwise help first-responders address the emergency.

The incident status element 954 includes a status input 970 that allows an operator to input a real-time update regarding the status of the emergency situation. The update may be pushed down to individuals for immediate display on their user devices 130 and to law enforcement via the first responder user devices 162. As updates are input during an emergency situation, the updates create a timeline 972 of events with time stamps. The timeline may be additionally utilized for after-the-fact incident reporting and investigation.

The safe list element 956 displays the real-time safety status of individuals as received from the individuals' user devices 130. As mentioned above in association with FIG. 9, the statuses of the individuals' may be color-coded or differentiated in some way so that an operator may focus on the individuals still in danger as events unfold.

The incident upload element 958 displays the information describing the emergency situation received from individuals. As mentioned above in association with FIG. 7, individuals may upload information about an emergency situation to the system 200 in the form of text, audio, and photo/video. In the illustrated embodiment, the incident upload element 958 displays each individual 974 who has uploaded and the items of content 976 they have uploaded. Each item of uploaded content 976 is associated with a time stamp to better coordinate response efforts and incident reporting. In some embodiments, the operator may select specific items of uploaded content 976 for transmission to specific first responders, or may choose to send highly pertinent items (e.g., a photo of a shooter) to all first responders and law enforcement. Alternatively, as described above, a first responder may access the items of uploaded content 976 directly via the administrative dashboard on a mobile device through a web browser or native application.

Figure 11:
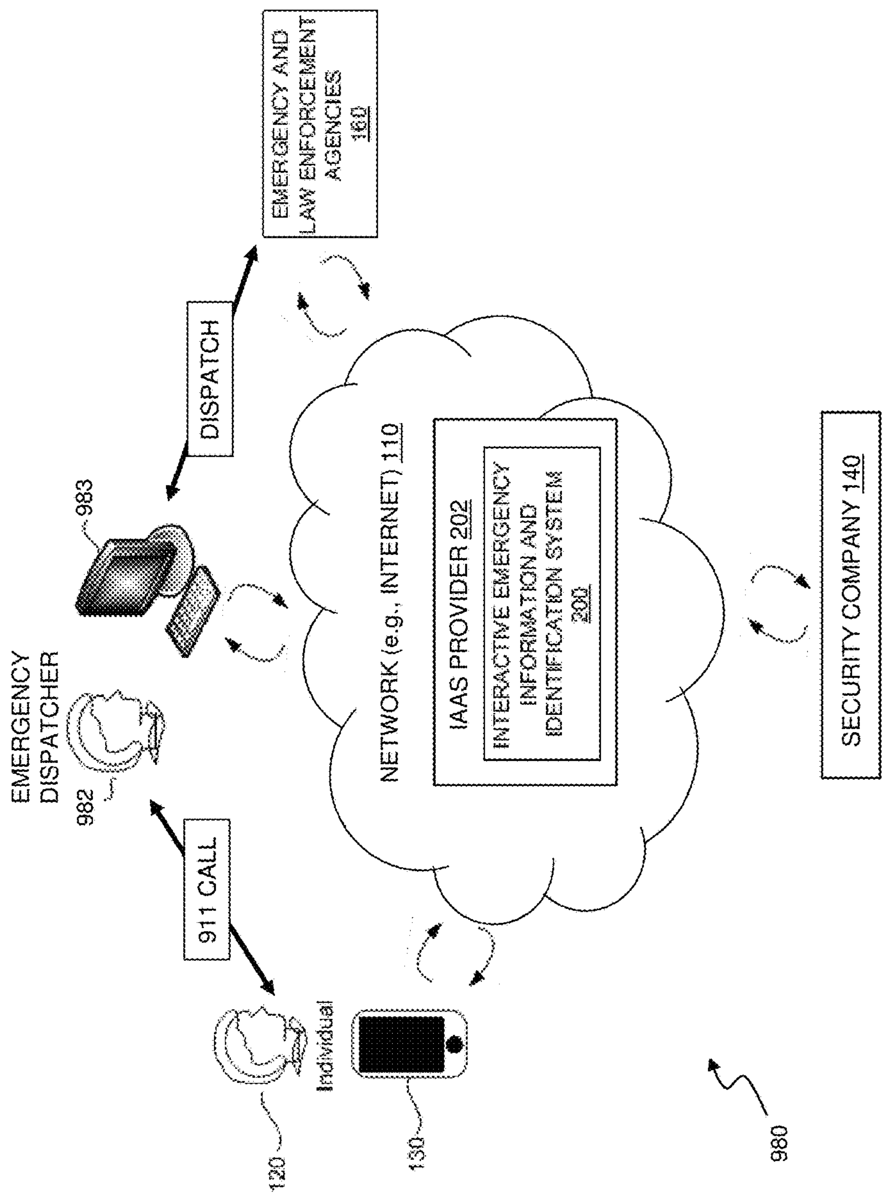
FIG. 11 illustrates an environment with systems for geographically locating individuals who dial an emergency number on a mobile device, according to one embodiment of the present disclosure.

FIG. 11 illustrates an environment 980 with systems for geographically locating individuals who dial an emergency number on a mobile device, according to one embodiment of the present disclosure. The environment 980 is similar to the environment 102 shown in FIG. 1A, in that it includes the interactive emergency information and identification system 200 to which user devices 130 and emergency and law enforcement agencies 160 connect to share information and coordinate a response during an emergency situation. The environment 980 further includes an emergency dispatcher 982 at a public safety answering point ("PSAP") who receives emergency (911) calls from individuals 120. The emergency dispatcher 982 utilizes a workstation 983 to access location and other information about the individual 120 making the call. In that regard, the dispatcher 982 may connect to the administrative user interface of the interactive emergency information and identification system 200 via the Internet or other network 110. As will be described in association with the method of FIG. 12, the system 200 may provide the dispatcher 982 with the individual's location much more quickly than traditional emergency call locating methods (e.g., Enhanced 911 services, etc.). The dispatcher 982 may contact and dispatch emergency agencies 160 to the individual if warranted by the situation.

Figure 12:
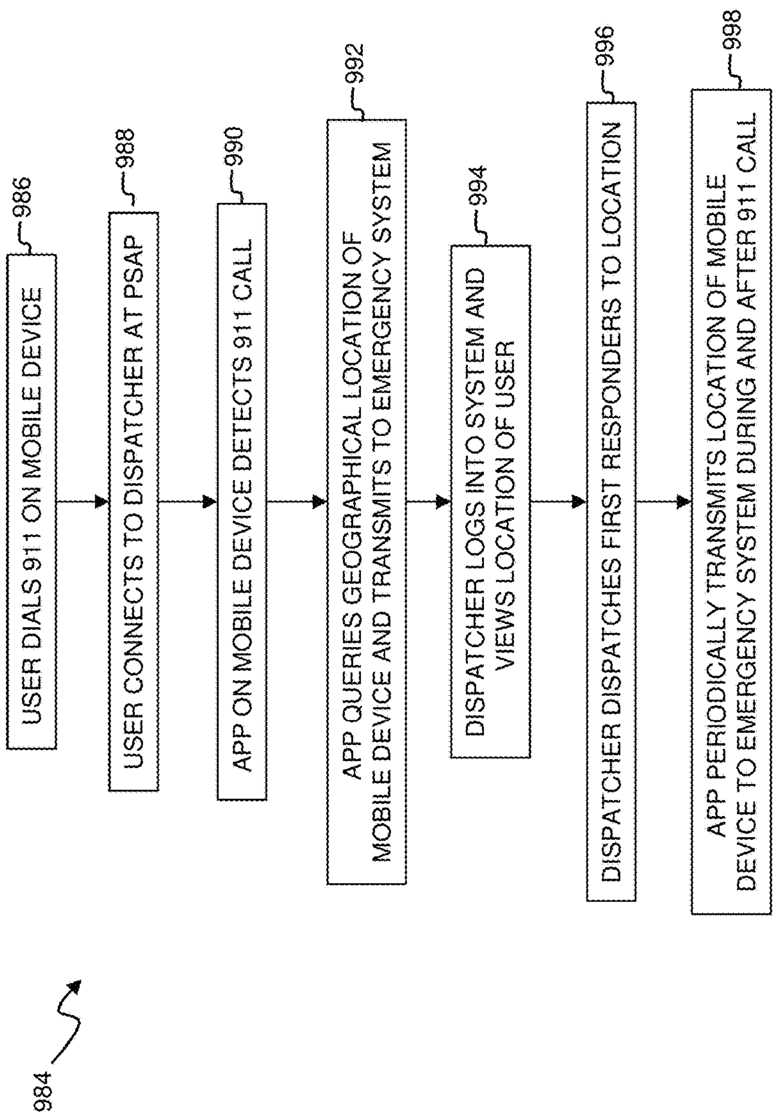
FIG. 12 illustrates a method for geographically locating an individual who dialed an emergency number on a mobile device, according to one embodiment of the present disclosure.

Referring now to FIG. 12, illustrated is a method 984 for geographically locating an individual who dialed an emergency number on a mobile device, according to one embodiment of the present disclosure. The method 984 begins at block 986 where the individual 120 dials an emergency number (e.g., 911) on his or her mobile device 130. At block 988, the individual is connected to the emergency dispatcher 982 at a PSAP who inquires about the individual's purpose of calling. As shown in block 990, an application (or "app") associated with the system 200 on the mobile device 130 detects that the individual dialed the emergency number. As mentioned above, such an app starts when the mobile device is powered on and constantly monitors outgoing calls made on the device to determine if a known emergency number is called. In that regard, the app is configured to detect calls made via a standard cellular voice line and/or calls made over a voice over IP (VoIP) line via a mobile data network connection (e.g., cellular data network, WiFi, etc.). Next, at block 992, the app on the mobile device queries the device for its geographical location. As discussed above, any number of hardware and/or software components within the mobile device may detect the location of the device. In one embodiment, the location is detected by a GPS transceiver. Further, if one or more of the location detecting components in the mobile device are disabled at the time of the emergency call, the app may enable all or some of them when a 911 call is made. The app then transmits the geographical location of the mobile device to the interactive emergency information and identification system 200 via the network 110, where it is stored in association with the individual.

Then, at block 994, the emergency dispatcher 982 logs into the administrative user interface of the system 200 via the workstation 983. In one embodiment, the system automatically matches the telephone number of the incoming call to a telephone number associated with the individual that is stored in the system. Upon a match, the administrative user interface displays all known information about the individual, including the individual's current geographical location just received from the individual's mobile device. In one embodiment, the user's location will be displayed on a graphical map. In this manner, the dispatcher has knowledge of the individual's current location in a matter of seconds and does not need to rely on the individual to relay an accurate location. Further, in some embodiments, a dispatcher may have the option to immediately notify the individual's emergency contacts stored in the system 200 of the fact that the individual has dialed the emergency number. Such notification may occur automatically or the dispatcher may ask the individual whether he or she would like the notification to happen.

Next, in block 996, the emergency dispatcher 982 dispatches emergency and/or law enforcement to or adjacent the geographical location of the individual, as reported by the individual's mobile device. Notably, the app on the mobile device will periodically query the current location of the user device during the pendency of the emergency call between the individual and the dispatcher and transmit the updated location to the system 200 for display to the dispatcher, as shown in block 998. In one embodiment, the mobile device will continue to transmit its location to the system 200 after the emergency call has ended until the dispatcher receives notice that the first responders have reached the individual. In this manner, an inadvertent dropped call will not hinder the location acquisition of the individual. In one embodiment, the frequency with which the mobile device transmits its location to the system 200 during and after the emergency call may depend on the remaining battery life of the device. For instance, the mobile device may transmit its location every 30 seconds when the device's battery has more than 25% battery life remaining, but progressively increase the transmission interval as the battery life drains from 25% to 0%.

It is understood that the method 984 for geographically locating an individual who dialed an emergency number on a mobile device is simply an example embodiment, and in alternative embodiments, additional and/or different steps may be included in the method. Further, steps may be excluded or performed in a different order from the method 984 in certain embodiments. For example, in one embodiment, if the emergency call between the individual and the emergency dispatcher is unintentionally disconnected, the app on the mobile device may present control elements labeled "I'm OK" and "Call me back" to the individual. If first responders have reached the individual and there is no need to reconnect with the dispatcher, the individual may activate the "I'm OK" element. Otherwise, the individual may activate the "Call me back" element to be reconnected with the dispatcher. In one embodiment, if the individual has moved after first responders have been dispatched, the operator can redirect the en route first responders to the new location, or periodically or continually provide updated geographic location information.

Further, in other embodiments of method 984, users may initiate contact with a dispatcher at a PSAP via a panic button displayed on their user device rather than by dialing an emergency telephone number. For example, in block 986, a user in danger may select a panic button in the app executing on their user device, and then, in blocks 990 and 992, the app queries the geographic location of the user device and transmits an alert message containing the location information to a dispatcher. In some embodiments, when the panic button is activated, the individual is given a choice as to whether they would like to speak with a dispatcher via a telephone connection or not. In either case, the dispatcher may then dispatch first responders based on the received location information. Further, if the user device on which the panic button was triggered is associated with a minor, the system 200 may trigger an Amber Alert-type notification to other users of the system 200. Additionally, in some embodiments, when an individual activates dials 911 or the panic button, the system 200 automatically sends a message (via SMS, email, etc.) to the emergency contacts associated with the individual in the database 220.

Further, the method 984 may be performed by logic that may comprise hardware (e.g., dedicated logic, programmable logic, and microcode), software (such as software run on a general-purpose computer system or a dedicated machine), or a combination of both. In one example embodiment, the processing logic resides at the interactive emergency information and identification system 200, and the various elements of the system 200 can perform the method 984.

Figure 13:
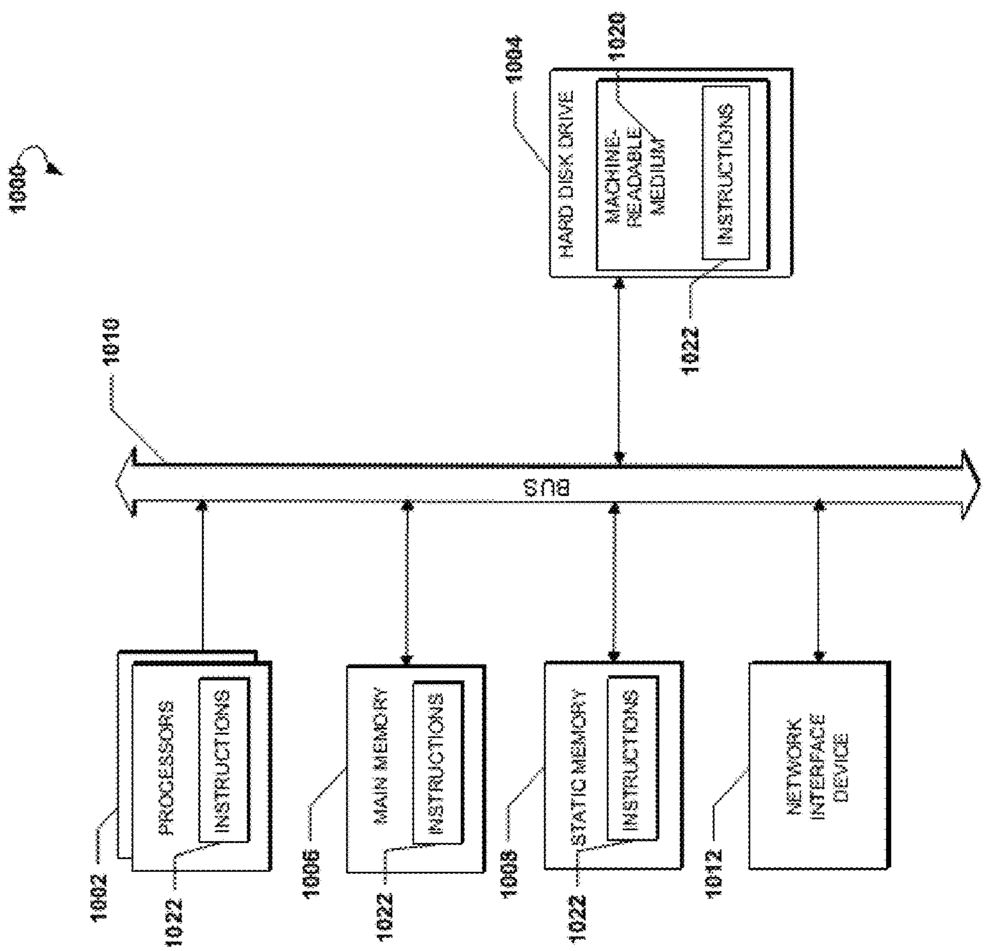
FIG. 13 shows a diagrammatic representation of a computing device for a machine in the exemplary electronic form of a computer system, within which a set of instructions for causing the machine to perform any one or more of the methodologies discussed herein can be executed.

FIG. 13 shows a diagrammatic representation of a computing device for a machine in the exemplary electronic form of a computer system 1000, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet computer, a set-top box (STB), a cellular telephone, a smart phone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor or multiple processors 1002, a hard disk drive 1004, a main memory 1006 and a static memory 1008, which communicate with each other via a bus 1010. The computer system 1000 may also include a network interface device 1012 that provides wired and/or wireless access to communication networks, such as the Internet. The hard disk drive 1004 may include a computer-readable medium 1020, which stores one or more sets of instructions 1022 embodying or utilized by any one or more of the methodologies or functions described herein. The instructions 1022 can also reside, completely or at least partially, within the main memory 1006 and/or within the processors 1002 during execution thereof by the computer system 1000. The main memory 1006 and the processors 1002 also constitute non-transitory, machine-readable media.

While the computer-readable medium 1020 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks (DVDs), RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Figure 14:
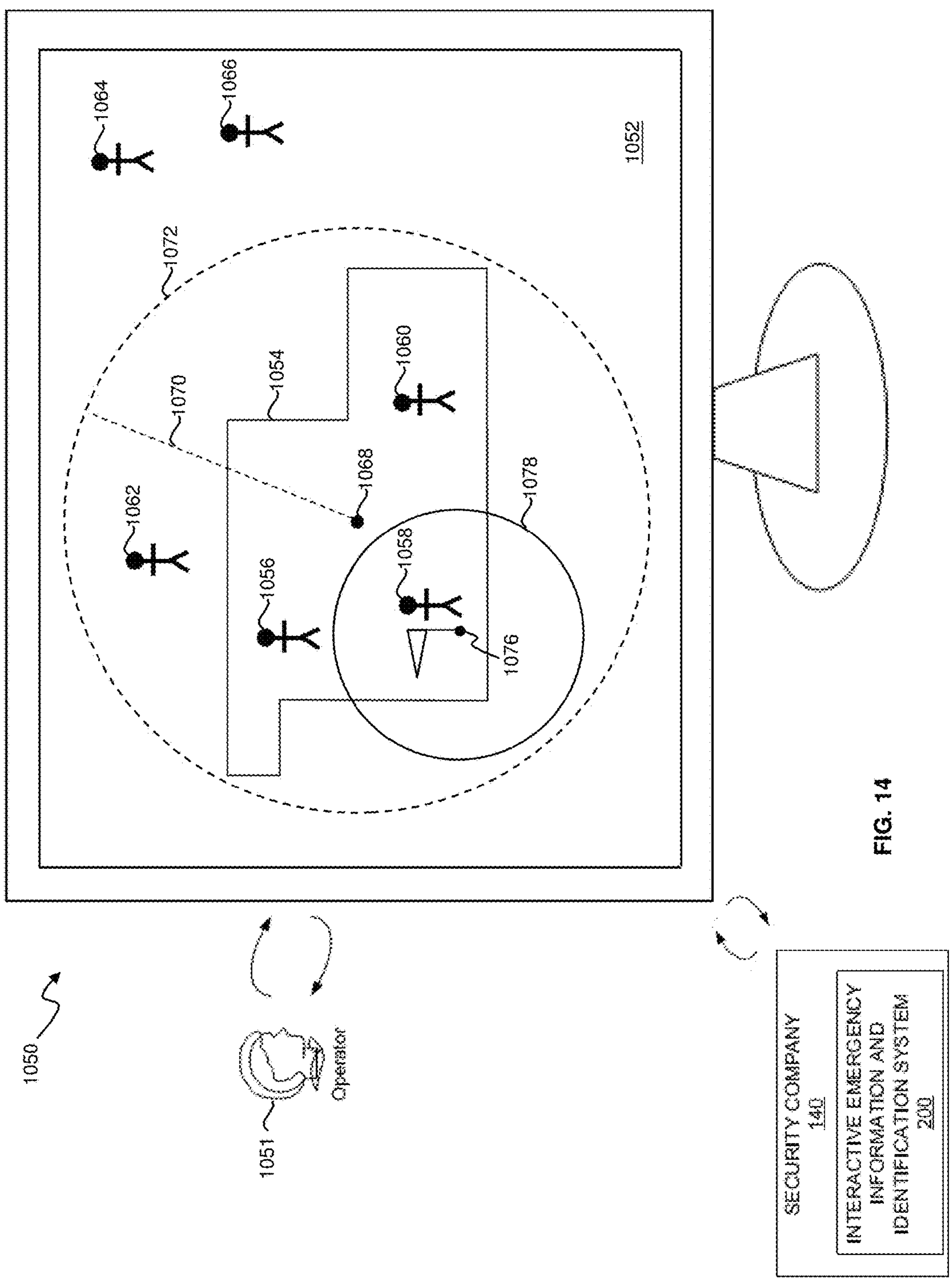
FIG. 14. illustrates another example screen of the administrative user interface of the interactive emergency information and identification system 200, according to an embodiment of the present disclosure.

Referring now to FIG. 14, illustrated is another example screen 1050 of the administrative user interface of the interactive emergency information and identification system 200, according to an embodiment of the present disclosure. The system 200 is operated by the security company 140 in either of the environments 100 and 102 shown in FIGS. 1 and 1A. Aspects of the environments 100 and 102 are not shown in FIG. 14 for the sake of efficiency. An operator 1051 associated with the security company 140 or the emergency and law enforcement agencies 160 may use aspects of the administrative user interface, including the example screen 1050, to coordinate emergency response and communications during an emergency situation. As explained above, the administrative user interface may be accessed via a web-browser or dedicated application on any computing device with a network connection to the system 200. This can permit an administrator with access who is within the geo-fence, any proximity zone, or adjacent to the location of the emergency or the geo-fence, to access the system described herein. A law enforcement or emergency user can be provided temporary administrative access to the information and identification system for the duration of the emergency to directly locate and contact any users, e.g., such as those in danger.

The example screen 1050 of FIG. 14 displays a map 1052 showing a landmark 1054 and individuals associated with the landmark. The landmark 1054 may be any geographical area, a geological feature, a geographical coordinate, a parcel of property (e.g., a golf course), a building (e.g., a mall, an office building, an apartment building, etc.), a collection of buildings (e.g., a campus, a shopping center, a municipality, buildings managed by the same property manager, etc.), a portion of a building, or any other geographical area. For instance, in one embodiment, the landmark 1054 is a university campus and the individuals 1056, 1058, 1060, 1062, 1064, and 1066 are associated with the campus as students, professors, staff, etc. The individuals are each associated with one or more user devices that are configured to detect and transmit a current geographical location to the system 200, as explained the context of environments 100 and 102. The individuals 1056-1066 are registered with the system 200 and are associated in the database 220 with one or more user devices. In another example, the landmark 1054 is a geographical area—such as a shopping center or mall—where the individuals that enter the area are random and unpredictable (i.e., are not previously registered). Such individuals may become associated with the geographical area when they are physically in or near the landmark. In that regard, an individual may become registered with the system 200 when the system detects the presence of the individual's user device and information about the individual is added to the database 220. In some embodiments, an individual can opt out of being registered with the system 200 or control the amount of information that collected from the user device.

During an emergency situation, it may be advantageous to alert fewer than all of the registered individuals of the situation, for example, to decrease panic and reduce communication traffic. Specifically, those individuals that are far enough away from the location of the emergency situation may not be in any danger and, thus, do not need to receive an alert (or can receive a more generic alert) on their user device. For example, if the landmark 1054 is a building and the registered individuals work in the building, it may be unnecessary to alert every individual of a fire alarm if some individuals, for example, are currently at locations remote from the building. In one embodiment, if the building is particularly large and nature of the emergency can be contained to a floor, only users on that floor need be notified. The method and system described in association with FIGS. 14-15 track the locations of individuals associated with a landmark via a virtual beacon and dynamically determine which users to alert during an emergency at or adjacent the landmark based on their respective distances from the virtual beacon.

In that regard, the map 1052 contains a virtual beacon 1068 that is positioned in the landmark 1054. The virtual beacon 1068 may be associated with the landmark regardless of whether there is currently an emergency situation at the landmark. The virtual beacon 1068 may be manually placed on the map 1052 by the operator 1051 and/or it may be automatically placed on the map by the system 200 based on the characteristics of the landmark 1054. In the illustrated embodiment, the virtual beacon 1068 is positioned at approximately the center of the landmark 1054. In other embodiments, where the landmark represents a relatively large geographical area, multiple virtual beacons may be associated with a single landmark. For example, when the landmark is a municipality (horizontally expansive) or high-rise building (vertically expansive), a plurality of virtual beacons may be placed at spaced locations within the landmark to ensure adequate coverage. In such an embodiment, if an emergency is confined to a section of the landmark, only those individuals associated with a virtual beacon covering that section of the landmark will be alerted—thus, avoiding unnecessary panic.

In operation, the system 200 dynamically creates and modifies an emergency notification list based on the movements of the registered individuals 1056-1066 with respect to the virtual beacon 1068. Individuals on the notification list are notified of emergency situations that occur at or near the landmark 1054, or within an associated geo-fence, and individuals not on the notification list are not so notified so as to reduce unnecessary panic and communication traffic. In one embodiment, a registered individual's distance from the virtual beacon determines whether he or she will be subscribed to the emergency notification list. For instance, individuals further than a specific distance away from the virtual beacon will be unsubscribed (i.e., removed) from the notification list, and individuals within the specific distance will be subscribed to the notification list. The list may be changed dynamically over periodic intervals or upon occurrence of a triggering event, such as an emergency occurring within a certain distance of the virtual beacon. In the illustrated embodiment, the distance from the virtual beacon 1068 that triggers subscription/un-subscription is represented by the radius 1070 extending radially outward from the virtual beacon. The subscription distance (i.e., the length of the radius) may be manually set by the operator 1051 and/or it may be automatically set by the system 200 based on the characteristics of the landmark 1054 or other predetermined characteristics (e.g., geographic locale, day, time of day, etc.).

The outer bound of the radius 1070 around the virtual beacon forms a virtual boundary (or perimeter) 1072 that is typically set to encompass at least the entirety of the landmark (or a specific portion of the landmark when there are multiple virtual beacons associated the landmark), and in some embodiments to cover adjacent grounds or multiple adjacent landmarks, as well. In the illustrated embodiment, the virtual boundary 1072 is a circle, however, in other embodiments, the virtual boundary 1072 may be three dimensional. For instance, if the landmark is a multi-floor building, the radius 1070 may extend from the virtual beacon in three dimensions and define a virtual boundary that encompasses more that one of the floors (i.e., the floors occupied by a specific business or other entity). One of ordinary skill in the art would understand that, in other embodiments, the distance away from the virtual beacon 1068 that triggers subscription/un-subscription may not be uniform around the virtual beacon. For example, the horizontal distance might be set larger than vertical distances so that an entire floor of a large floor plan building would be covered, but only that floor and adjacent floors might be encompassed within the perimeter. For instance, the subscription distance may be dependent upon the perimeter of the landmark with which the virtual beacon is associated. In this manner, the virtual boundary may be any two-dimensional or three-dimensional polygon.

To monitor the locations of registered individuals 1056-1066 with respect to the virtual beacon 1068, user devices associated with the individuals periodically transmit their locations to the system 200. In some embodiments, the system 200 sends periodic requests that the user devices report their current location. In other embodiments, the user devices periodically transmit their current location to the system 200 whenever they are powered on. Using this location data, the system 200 determines whether the user devices within the distance of the radius 1070 from the virtual beacon 1068 (i.e., inside or outside of the virtual boundary 1072). In some embodiments in which the landmark is a multi-floor building, the location information received from the user devices may include information allowing first responders to determine an individual's vertical position in the building. For instance, received GPS information may include altitude as well as latitude and longitude. Further, a transceiver in the user device, such as a Bluetooth Low Energy transceiver, may detect a user's proximity to various sensors (or beacons) within a building and report such proximity information to the system 200. For instance, a building may include proximity sensor on each floor, enabling a user device to report on which floor it is located.

The individuals associated with the user devices located within the boundary 1072 are added to a notification list (individuals 1056-1062 on map 1052). The individuals associated with the user devices located outside of the boundary 1072 are removed if currently on the list (individuals 1064 and 1066 on map 1052). As such, the notification list includes a real-time list of individuals who need to be notified during an emergency situation at the landmark. Further, in other embodiments, the system actively detects when a specific user device crosses the boundary 1072 and removes or adds the individual associated with the user device to the notification list in response to the detected crossing.

In the event of an emergency, the system 200 transmits emergency notifications to the user devices associated with the individuals on the notification list. After such notifications, the system 200 may perform the emergency information dissemination steps described in association with FIGS. 1-10. For instance, the system 200 may define a geo-fence around the actual location of the emergency situation and send detailed emergency information and instructions to the individuals within the geo-fence (which may encompass less than, the same space, or more than, the entire landmark 1054).

In that regard, the map 1052 also shows a location of an emergency situation 1076 that within the area of the landmark 1054. The system 200 has defined a geo-fence 1078 around the location of the emergency situation, as described in association with FIGS. 1-10. Using the user device location information received by the system 200, the system determines that the individual 1058 is within the geo-fence 1078 and takes additional measures to ensure the safety of the individual. A method more fully describing the virtual beacon-based notification system described in association with FIG. 14 will be discussed in association with FIG. 15.

Figure 15:
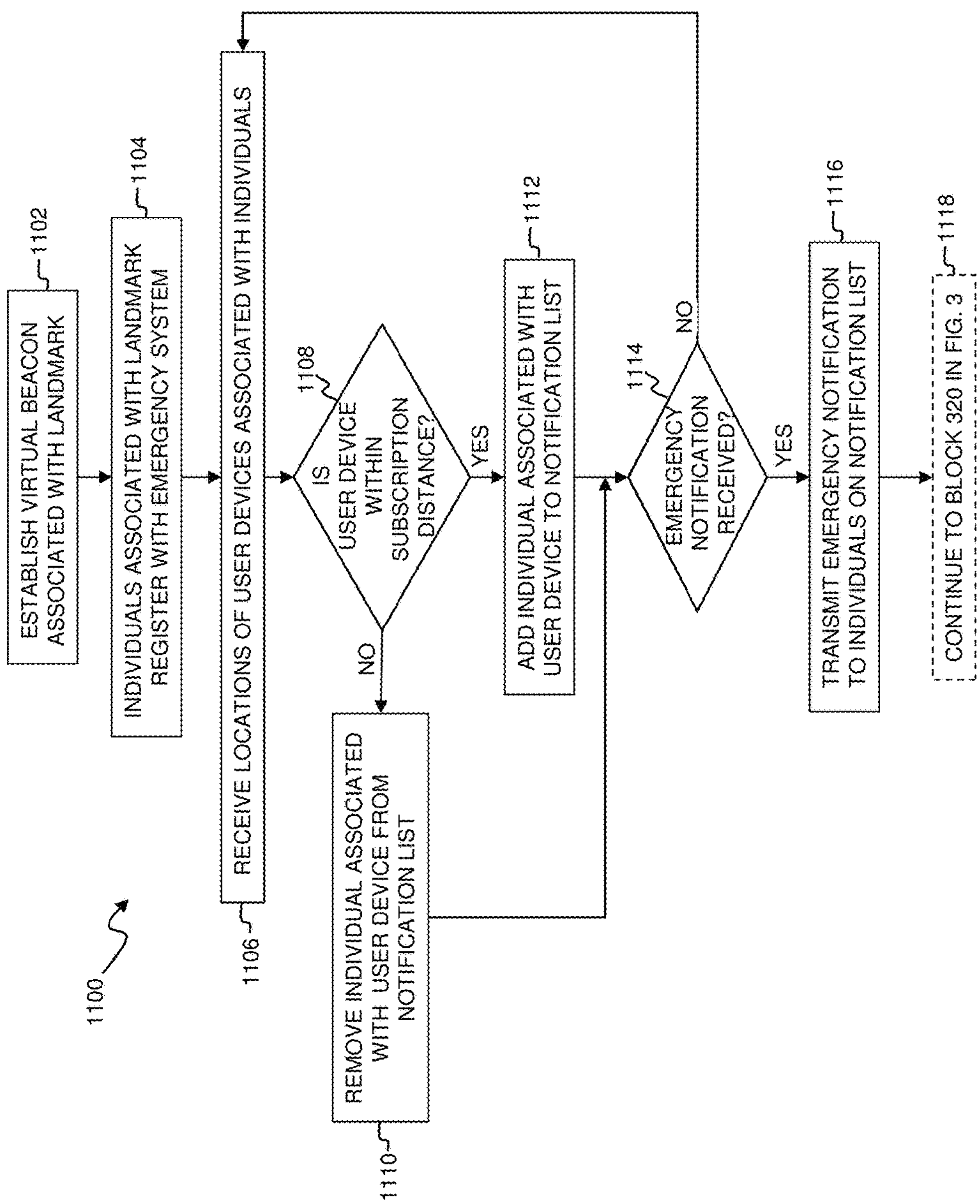
FIG. 15 illustrates a simplified flow chart of a method for virtual beacon-based emergency notification of individuals, according to an embodiment of the present disclosure.

Referring now to FIG. 15, illustrated is a simplified flow chart of a method 1100 for virtual beacon-based emergency notification of individuals, according to an embodiment of the present disclosure. The method 1100 may be implemented in the context of the system discussed in association with FIG. 14. The method 1100 begins at block 1102 where a virtual beacon is established (i.e., placed by an operator and/or algorithm) in or near a landmark. Notably, the virtual beacon is established before an emergency situation occurs, and may also be used to monitor individuals in non-emergency situations, e.g., to track access to dangerous or confidential materials. The virtual beacon has associated with it a distance that triggers subscription/un-subscription from an emergency notification list. The set distance may form a virtual boundary that encompasses all or some of the landmark, or even adjacent landmark(s) and/or property. Next, in block 1104, individuals associated with the landmark register with the emergency system 200. As an aspect of this, the individuals are added to a database and associated with one or more user devices. The method 1100 continues to block 1106 where the emergency system 200 receives from the user devices location data describing the geographical locations of the user devices. In most cases, the location of a user device will correspond to the location of the individual associated with the user device.

Then, the method continues to decision block 1108, where it is determined whether each of the user devices are within the subscription distance from the virtual beacon (i.e., within the boundary created by the virtual beacon). If a particular user device is not within the subscription distance, the method proceeds to block 1110 where the individual associated with the particular user device is removed from a list of registered users that will be notified in the event of an emergency at the landmark. If, however, the particular user device is within the distance, the method proceeds to block 1112 where the individual associated with the particular user device is added to the notification list and will be notified in the event of an emergency at the landmark. Next, at decision block 1114, it is determined whether an emergency notification associated with the landmark has been received. If no such notification has been received, the method 1100 returns to block 1106, where the emergency system continues to receive the geographical locations of the user devices associated with the individuals. If, however, an emergency notification has been received, the method 1100 proceeds to block 1116 where the emergency system transmits information about the emergency situation to the user devices associated with the individuals on the emergency notification list.

In some embodiments, the emergency notification may originate from one or more sensors positioned in areas of interest. For example, a seismic sensor placed near a fault line may detect seismic activity or tsunami sensor positioned off-shore may detect when water levels are lower or higher than a predetermined threshold for a specific amount of time, or both. In some embodiments, when such a sensor detects unusual activity it transmits a notification to the system 200, which processes the information and transmits emergency notifications to user devices that are on emergency notification lists associated with virtual beacons within a specific range of the sensor. In one embodiment, a sensor itself may act as a virtual beacon and user devices are subscribed to the notification list if they come within a specified distance from the sensor. In another embodiment, the sensors themselves may transmit push emergency notifications to nearby user devices that are in proximity. In such an embodiment, the geographic range of the user devices alerted may depend on the type and severity of the activity detected by the sensor.

Finally, the method 1100 optionally proceeds to block 1118 where the method continues to block 320 of the method 300 illustrated in FIG. 3. In that regard, the system 200 may perform any or all remaining emergency information dissemination steps described in association with the method 300. For instance, the system 200 may define a geo-fence around the location of the emergency situation itself and send detailed emergency information and instructions to the individuals within the geo-fence (which may encompass less than the entire landmark). In that regard, only a subset of the individuals on the notification list may receive further information/instructions about the emergency situation, or individuals may be notified by geographic location, e.g., different messages for those in the geo-fence, adjacent the geo-fence, and away from the geo-fence.

One of ordinary skill in the art would understand that the method 1100 of virtual beacon-based emergency notification of individuals is simply an example embodiment, and in alternative embodiments, additional and/or different steps may be included in the method. Further, steps may be excluded or performed in a different order from the method 1100 in certain embodiments. For example, in one embodiment, the establishing of a virtual beacon in block 1102 may be performed after the individuals have registered with the emergency system in block 1104. Further, in some embodiments, the emergency system may continually receive the geographical locations of the user devices throughout the method 1100 and not just during block 1106. For instance, the user devices may periodically transmit their current location to the system 200 whenever they are powered on.

The method 1100 may be performed by logic that may comprise hardware (e.g., dedicated logic, programmable logic, and microcode), software (such as software run on a general-purpose computer system or a dedicated machine), or a combination of both (e.g., computer system 1000 of FIG. 1). In one example embodiment, the processing logic resides at the interactive emergency information and identification system 200, and the various elements of the system 200 can perform the method 1100.

Thus, various interactive emergency information and identification systems and methods have been described. Although embodiments have been described with reference to specific example embodiments, it will be evident that various modifications and changes may be made to these embodiments without departing from the broader spirit and scope of the system and method described herein. Further, elements of different embodiments in the present disclosure may be combined in various different manners to disclose additional embodiments still within the scope of the present embodiment. For instance, elements from environments 100, 102 and 980 may be combined, exchanged, or otherwise altered to form additional embodiments. Accordingly, the specification and drawings are to be regarded in an illustrative rather than a restrictive sense.

What is claimed is:

1. A computer-implemented method for interactive emergency information and identification, which method comprises:

sending, with a processor, an emergency notification to a plurality of user devices associated with a first defined category of individuals, the emergency notification including information describing an emergency situation;

transmitting, with the processor, a request for feedback associated with the emergency situation to the user devices associated with the first defined category of individuals;

receiving, with the processor, in response to the request, feedback from one or more user devices of the plurality of user devices, the feedback comprising safety statuses of individuals respectively associated with the one or more user devices;

receiving, with the processor, geographical location information from the one or more user devices of the plurality of user devices, the geographical location information representing respective locations of the one or more user devices;

generating, with the processor, a feedback report comprising the received feedback from the one or more user devices of the plurality of user devices, wherein the feedback report associates each received feedback with the individual associated with the user device from which the feedback was received;

generating, with the processor, a graphical map comprising a plurality of icons respectively representing individuals associated with the one or more user devices from which the feedback was received, the plurality of icons respectively positioned on the graphical map based on the received geographical locations of the individuals represented the plurality of icons; and displaying, on a screen of a display device, the graphical map and at least a portion of the feedback report visually correlated to the plurality of icons.

2. The method of claim 1, wherein the first defined category of individuals is based on an occupation of the individuals.

3. The method of claim 2, wherein the occupation is at least one of: first responder, civilian, student, professor, staff, and administrator.

4. The method of claim 1, further comprising:

sending, with a processor, the emergency notification to user devices associated with a second defined category of individuals;

transmitting, with the processor, a request for feedback associated with the emergency situation to the user devices associated with the second defined category of individuals;

receiving, with the processor, in response to the request, feedback from the user devices associated with the second defined category of individuals;

receiving, with the processor, geographical location information from the user devices associated with a second defined category of individuals; and visually differentiating, on the graphical map, icons associated with the first defined category of individuals and icons associated with the second defined category of individuals.

5. The method of claim 1, wherein the step of generating the feedback report comprises grouping the individuals of the first defined category of individuals based on the received safety statuses respectively associated with the individuals.

6. The method of claim 1, wherein the geographical location information is received together with the feedback.

7. The method of claim 1, wherein the step of transmitting the request for feedback comprises providing a plurality of options selectable via user interfaces of the user devices.

8. The method of claim 7, wherein the plurality of options includes an option to request help and an option stating the help is not required.

9. A computer-implemented method for interactive emergency information and identification, which method comprises:

sending, with a processor, an emergency notification to a plurality of user devices associated with a defined category of individuals, the emergency notification including information describing an emergency situation;

transmitting, with the processor, a request for feedback associated with the emergency situation to the plurality of user devices associated with the defined category of individuals;

receiving, with the processor, in response to the request, feedback from one or more of the plurality of user devices, the feedback comprising safety statuses of individuals respectively associated with the one or more user devices;

generating, with the processor, a report comprising the received feedback, the report organizing individuals of the defined category of individuals by safety status based on the received feedback along with a received location from the plurality of user devices; and displaying, to a user, the report on a screen of a display device, wherein the displaying further comprises displaying a graphical map with the received location of the plurality of user devices correlated with a plurality of icons.

10. The method of claim 9, wherein the step of transmitting the request for feedback comprises providing a plurality of options selectable via user interfaces of the user devices.

11. The method of claim 10, wherein the plurality of options includes an option to request help and an option stating the help is not required.

12. The method of claim 9, wherein the report comprises a list of each individual of the defined category of individuals and feedback associated with the individual.

13. The method of claim 12, wherein the list is organized according to the safety status associated with each individual of the defined category of individuals.

14. The method of claim 9, wherein the defined category of individuals is based on one or more classes of individuals.

15. The method of claim 14, wherein the one or more classes of individuals comprise a first class of first responders and a second class of civilians.

16. An interactive emergency information and identification system configured to:

send an emergency notification to a plurality of user devices associated with a defined category of individuals, the emergency notification including information describing an emergency situation;

transmit a request for feedback associated with the emergency situation to the user devices associated with the defined category of individuals;

receive, in response to the request, the feedback from one or more of the plurality of user devices;

receive geographical location information from the one or more user devices of the plurality of user devices, the geographical location information representing respective locations of the one or more user devices;

associate the received feedback with the individuals associated with the one or more of the plurality of user devices; and display a graphical map comprising a plurality of icons respectively representing individuals associated with the one or more user devices from which the feedback was received, the plurality of icons being positioned on the graphical map based on the respective geographical locations of the individual represented by the plurality of icons, wherein a first portion of the received feedback associated with a first individual is visually displayed on the map in association with a first icon representing the first individual.

17. The system of claim 16, wherein the received feedback comprises safety statuses of individuals associated with the one or more user devices.

18. The system of claim 17, wherein the displaying includes graphically differentiating the icons based on the respective current safety statuses of the individuals associated with the icons.

19. The system of claim 16, wherein the defined category of individuals is based on one or more classes of individuals.

20. The system of claim 19, wherein the one or more classes of individuals comprise a first class of first responders and a second class of civilians.

* * * * *